(12) United States Patent
Park et al.

(10) Patent No.: US 10,332,097 B2
(45) Date of Patent: Jun. 25, 2019

(54) MOBILE TERMINAL AND CONTROLLING METHOD THEREOF

(71) Applicant: LG ELECTRONICS INC., Seoul (KR)

(72) Inventors: Mihyun Park, Seoul (KR); Gukchan Lim, Seoul (KR); Hongjo Shim, Seoul (KR); Yoonwoo Lee, Seoul (KR); Seonghyok Kim, Seoul (KR); Dongeon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 867 days.

(21) Appl. No.: 14/848,140

(22) Filed: Sep. 8, 2015

(65) Prior Publication Data

US 2016/0335622 A1 Nov. 17, 2016

(30) Foreign Application Priority Data

May 14, 2015 (KR) ........................ 10-2015-0067200

(51) Int. Cl.
*G06Q 20/32* (2012.01)
*G06Q 10/10* (2012.01)
(Continued)

(52) U.S. Cl.
CPC ....... *G06Q 20/3255* (2013.01); *G06Q 10/107* (2013.01); *G06Q 20/322* (2013.01);
(Continued)

(58) Field of Classification Search
CPC .............................. H04W 4/12; G06Q 10/107
(Continued)

(56) References Cited

U.S. PATENT DOCUMENTS 7,177,909 B2 * 2/2007 Stark ..................... G06F 21/31
709/206
7,984,104 B1 * 7/2011 Stark ................... G06Q 10/107
709/206
(Continued)

FOREIGN PATENT DOCUMENTS

| KR | 10-2005-0015727 | 2/2005 |
| KR | 10-2011-0000056 | 1/2011 |
| KR | 10-2014-0113155 | 9/2014 |

OTHER PUBLICATIONS

European Patent Office Application Serial No. 151912805, Search Report dated Oct. 13, 2016, 8 pages.
(Continued)

*Primary Examiner* — William D Titcomb
(74) *Attorney, Agent, or Firm* — Lee, Hong, Degerman, Kang & Waimey

(57) ABSTRACT

A mobile terminal and controlling method thereof are disclosed, by which a plurality of message, product or registration card items and be collectively managed. The present invention includes a wireless communication unit configured to transmit/receive messages or data, a user input unit configured to receive a command from a user, a touchscreen, and a controller outputting the received messages through the touchscreen, the controller controlling a prescribed received message among the received messages to be included in a prescribed group, the controller, if a change command for the prescribed group is received through the user input unit, controlling the wireless communication unit to transmit a change request signal corresponding to some messages selected from the received messages included in the prescribed group.

18 Claims, 42 Drawing Sheets

(51) Int. Cl.
*H04M 1/725* (2006.01)
*G06Q 20/34* (2012.01)
*G06Q 20/40* (2012.01)
*H04L 12/58* (2006.01)
*H04W 4/08* (2009.01)
*H04W 4/12* (2009.01)
*H04W 88/02* (2009.01)

(52) U.S. Cl.
CPC ........... *G06Q 20/34* (2013.01); *G06Q 20/407* (2013.01); *H04L 51/04* (2013.01); *H04M 1/72547* (2013.01); *H04W 4/08* (2013.01); *H04W 4/12* (2013.01); *H04M 2250/22* (2013.01); *H04W 88/02* (2013.01)

(58) Field of Classification Search
USPC ........................................................ 715/863
See application file for complete search history.

(56) References Cited

U.S. PATENT DOCUMENTS

| | | | | |
|---|---|---|---|---|
| 8,238,940 | B2* | 8/2012 | Loeb | H04W 4/02 455/456.1 |
| 8,631,080 | B2* | 1/2014 | Goodman | G06Q 10/107 709/206 |
| 9,760,871 | B1* | 9/2017 | Pourfallah | G06Q 20/10 |
| 10,049,349 | B1* | 8/2018 | Grassadonia | G06Q 20/10 |
| 2004/0058694 | A1* | 3/2004 | Mendiola | G06Q 30/02 455/466 |
| 2005/0198153 | A1 | 9/2005 | Keohane et al. | |
| 2006/0136416 | A1 | 6/2006 | Yoo | |
| 2007/0203836 | A1 | 8/2007 | Dodin | |
| 2010/0197351 | A1* | 8/2010 | Ewell, Jr. | H04M 1/66 455/565 |
| 2011/0035240 | A1* | 2/2011 | Joao | G06Q 20/10 705/4 |
| 2011/0053611 | A1* | 3/2011 | Loeb | H04W 4/02 455/456.3 |
| 2012/0110500 | A1 | 5/2012 | Komhall | |
| 2012/0253852 | A1* | 10/2012 | Pourfallah | G06Q 20/3276 705/4 |
| 2013/0066984 | A1 | 3/2013 | Shin | |
| 2013/0185559 | A1* | 7/2013 | Morel | H04L 63/18 713/168 |
| 2013/0204791 | A1* | 8/2013 | Dorsey | G06Q 20/3226 705/44 |
| 2013/0282844 | A1* | 10/2013 | Logan | H04L 67/02 709/206 |
| 2014/0213318 | A1* | 7/2014 | Leem | G06F 3/0486 455/556.1 |
| 2014/0279094 | A1* | 9/2014 | Neighman | G06Q 20/206 705/16 |
| 2014/0298210 | A1* | 10/2014 | Park | G06F 3/0486 715/758 |
| 2015/0134439 | A1* | 5/2015 | Maxwell | G06Q 30/0207 705/14.27 |
| 2015/0186863 | A1* | 7/2015 | Schwalb | G06Q 20/24 705/44 |
| 2015/0186886 | A1* | 7/2015 | Schwalb | G06Q 20/405 705/44 |
| 2015/0187021 | A1* | 7/2015 | Moring | G06Q 40/12 705/17 |
| 2015/0193775 | A1* | 7/2015 | Douglas | G06Q 30/0253 705/14.23 |
| 2015/0324903 | A1* | 11/2015 | Starikova | G06Q 40/02 705/35 |
| 2015/0339666 | A1* | 11/2015 | Wilson | G06Q 20/40 705/44 |
| 2018/0032997 | A1* | 2/2018 | Gordon | G06Q 20/3224 |

OTHER PUBLICATIONS

PCT International Application No. PCT/KR2015/008507, Written Opinion of the International Searching Authority dated Feb. 12, 2016, 11 pages.

* cited by examiner

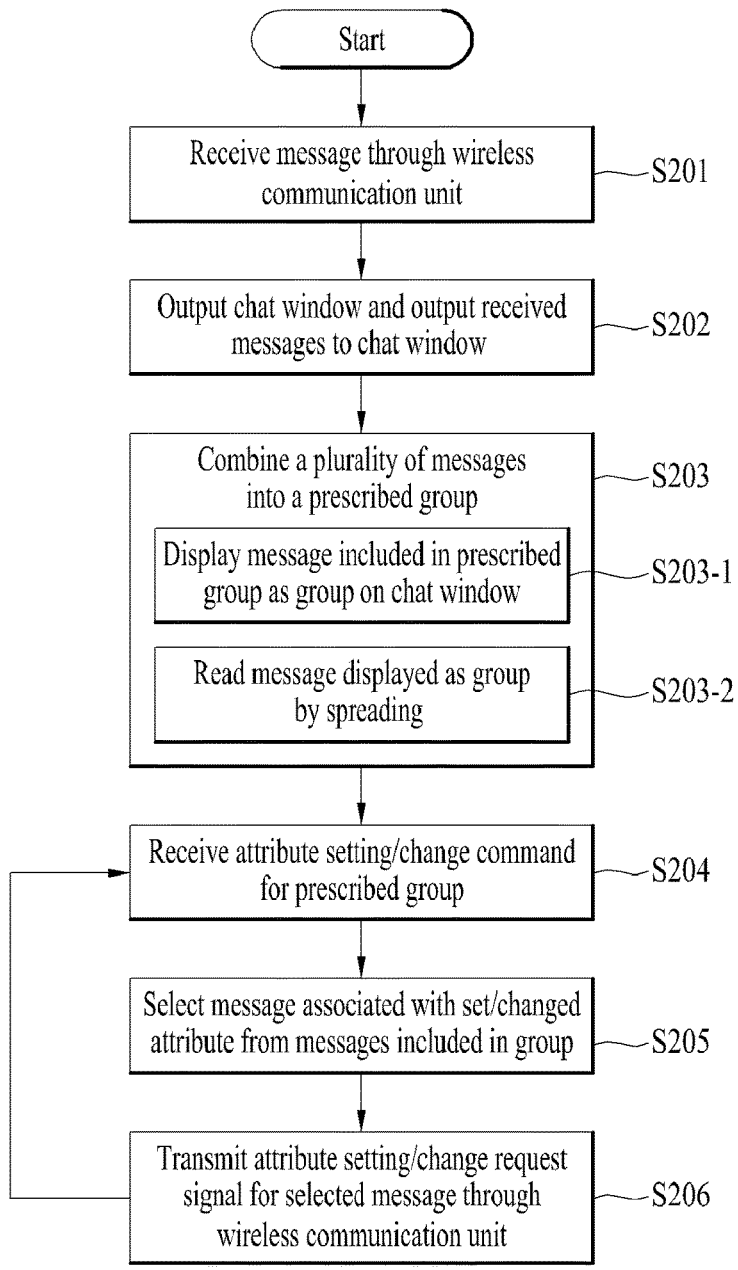

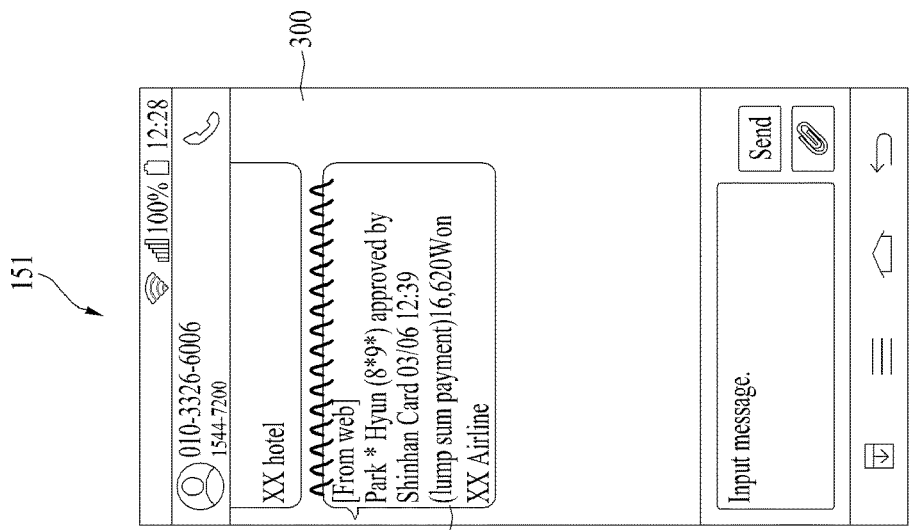

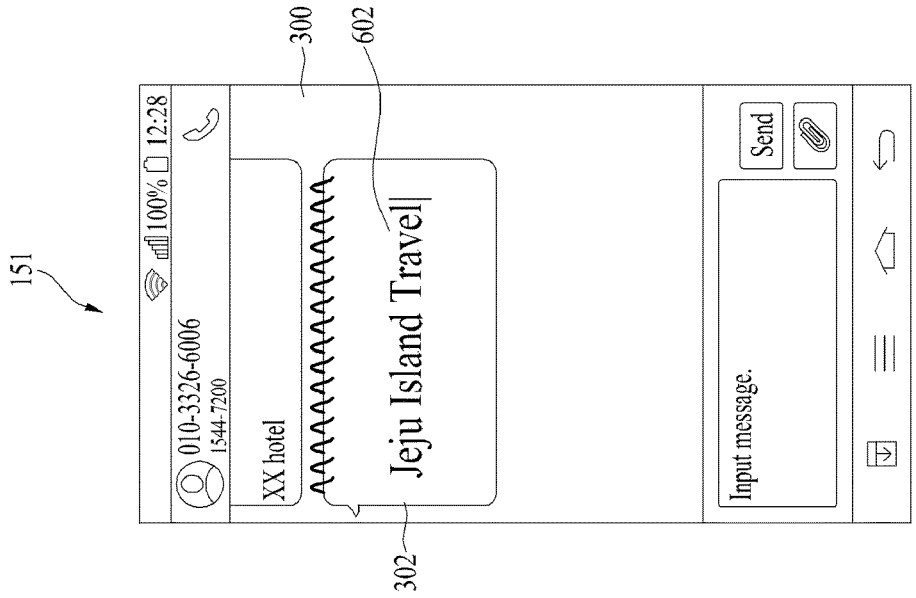
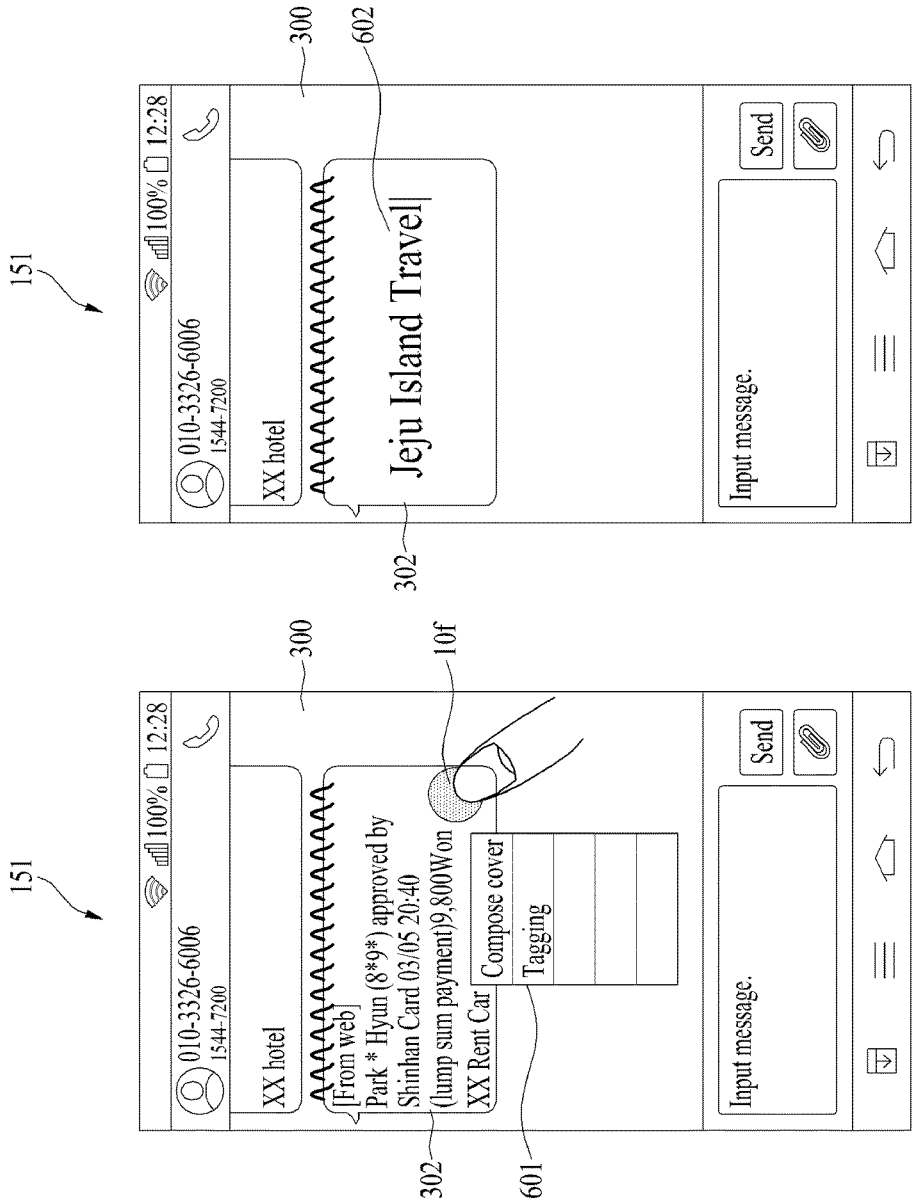

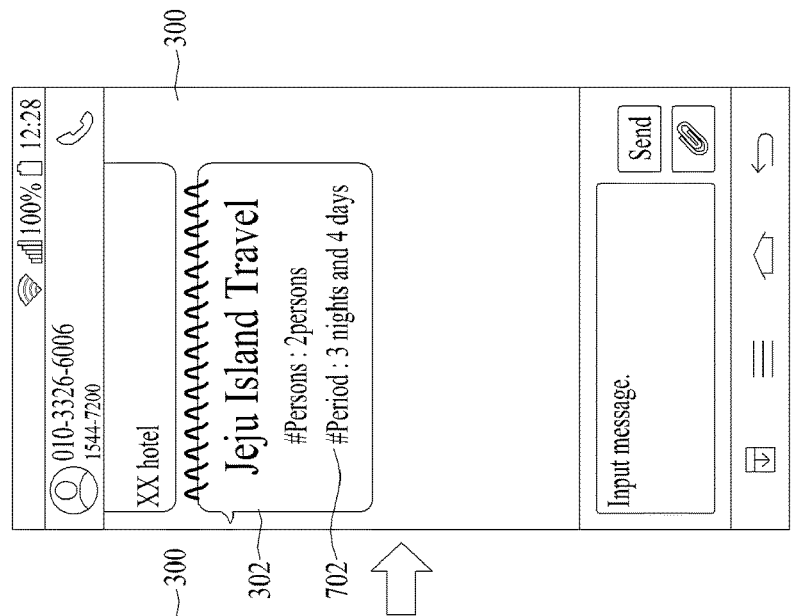
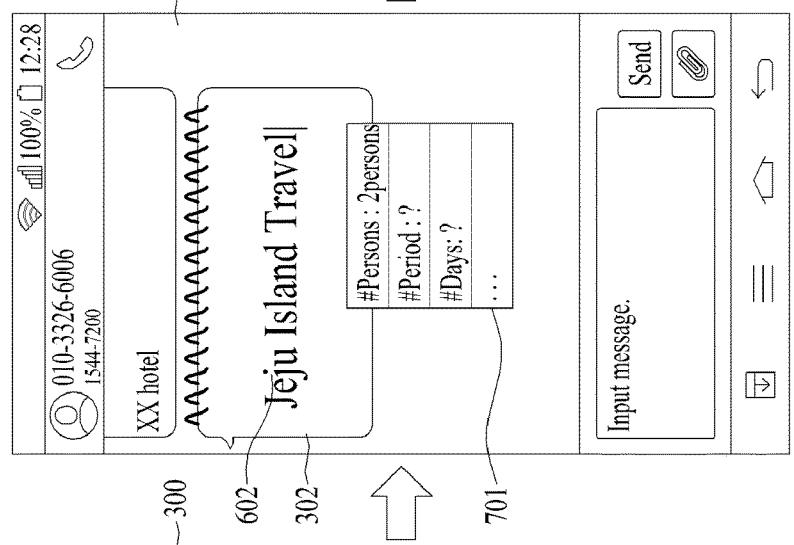
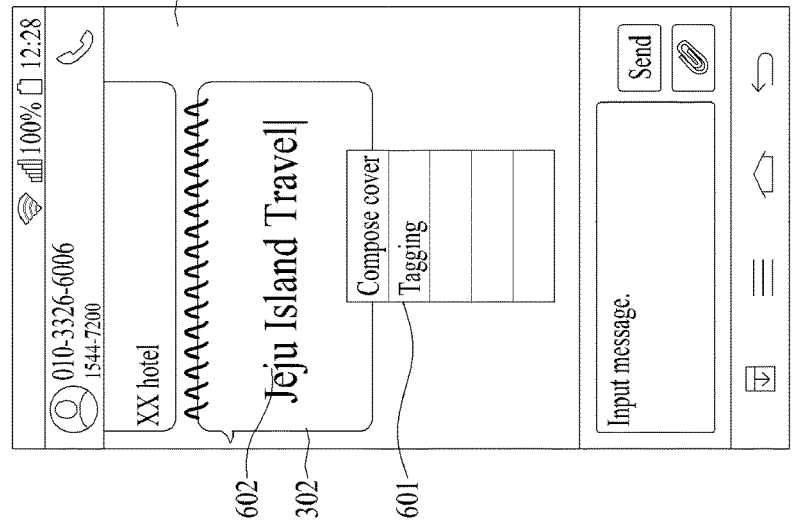

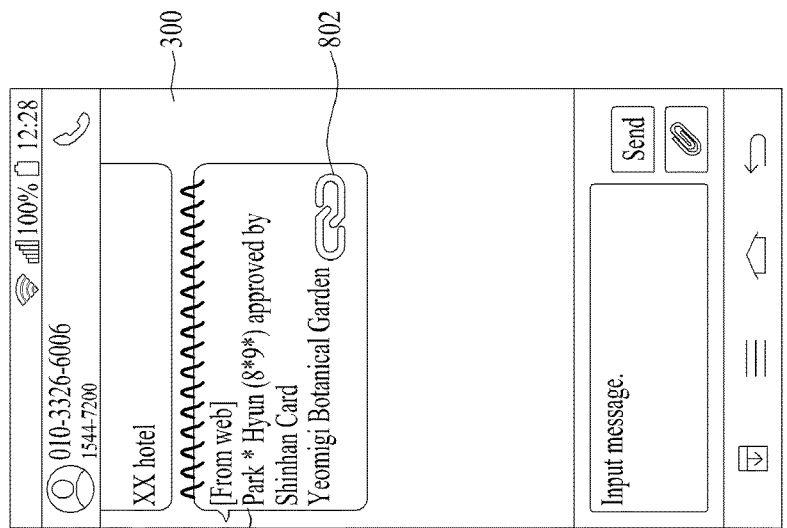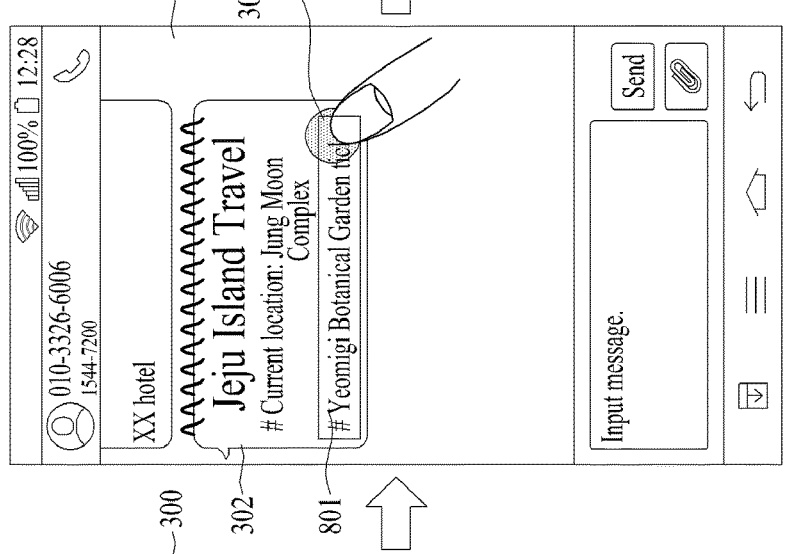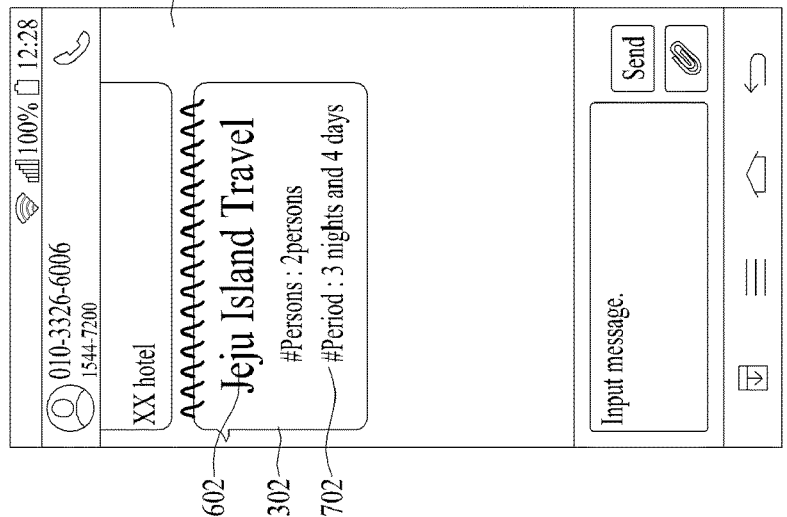

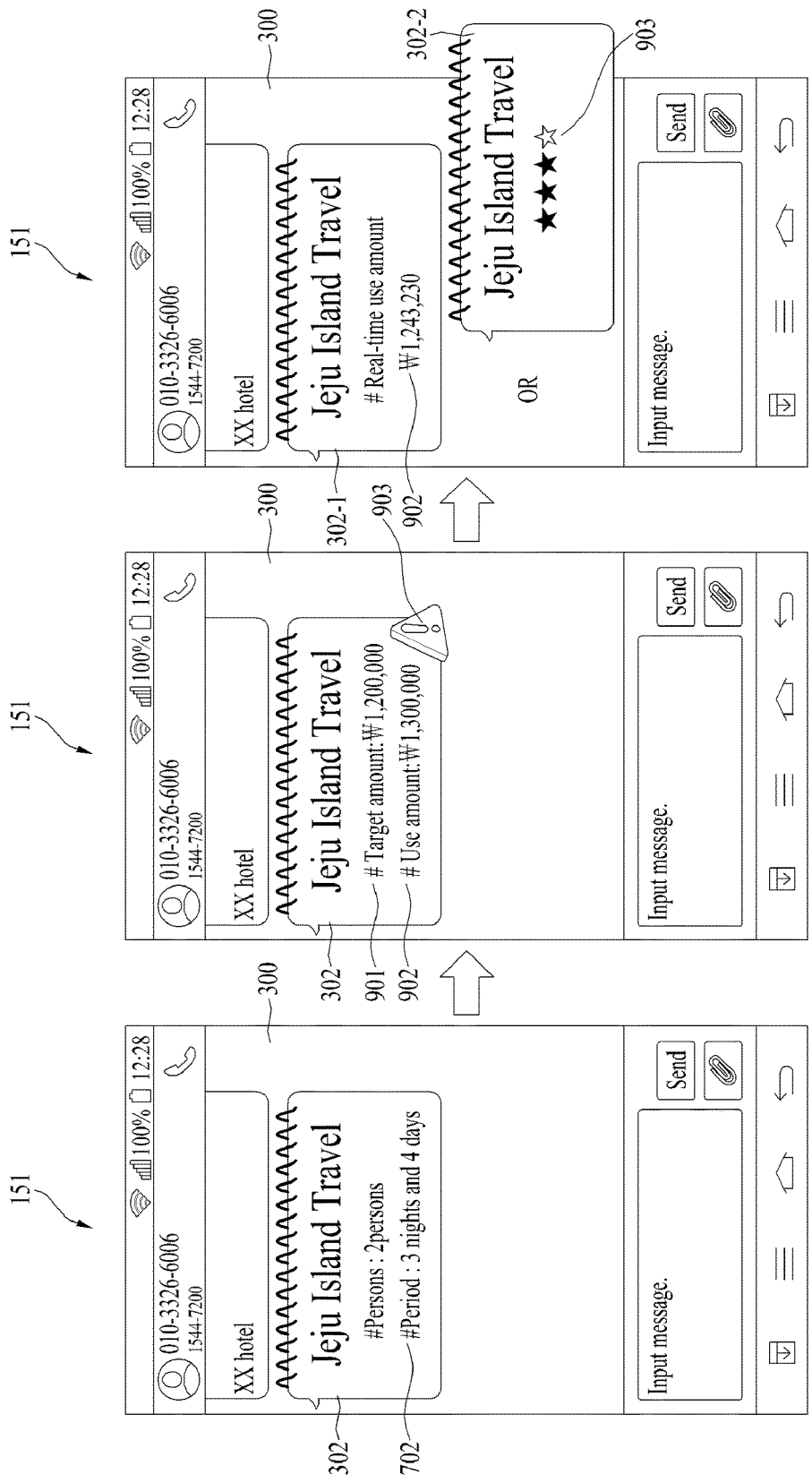

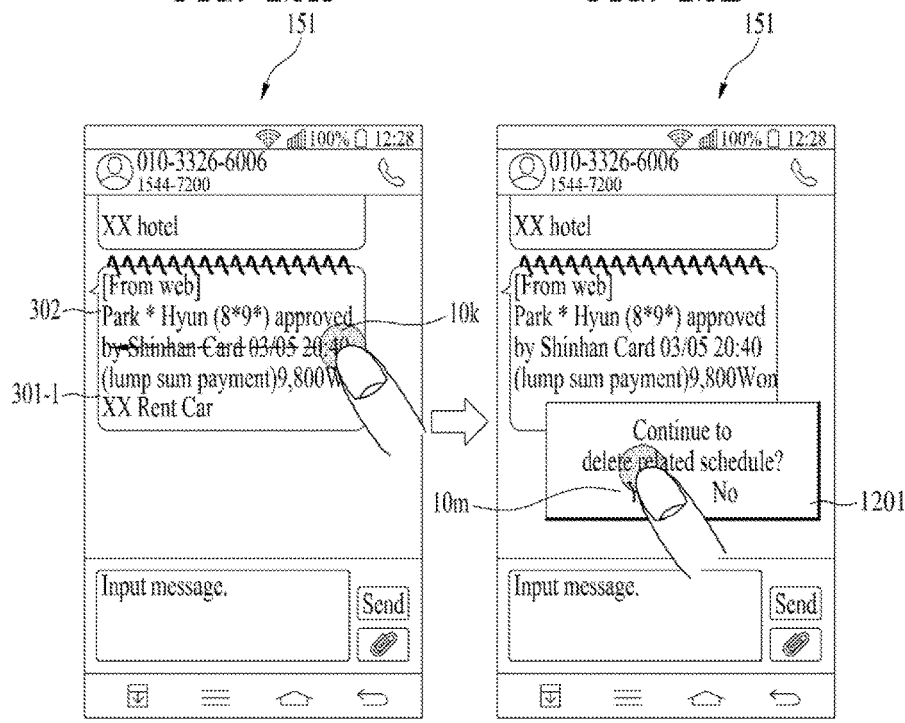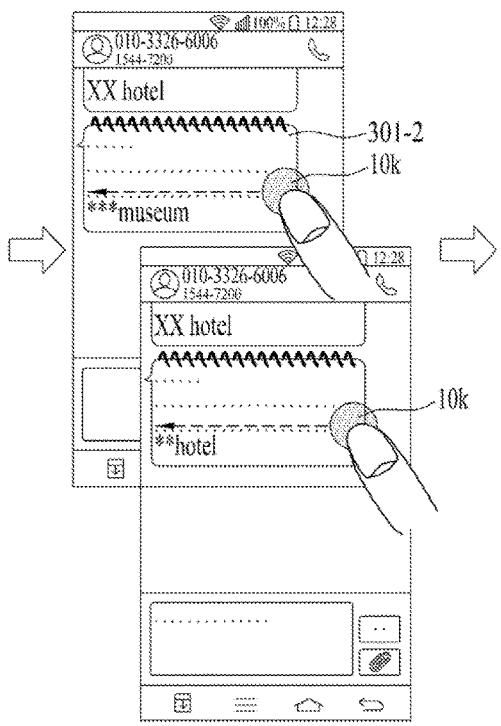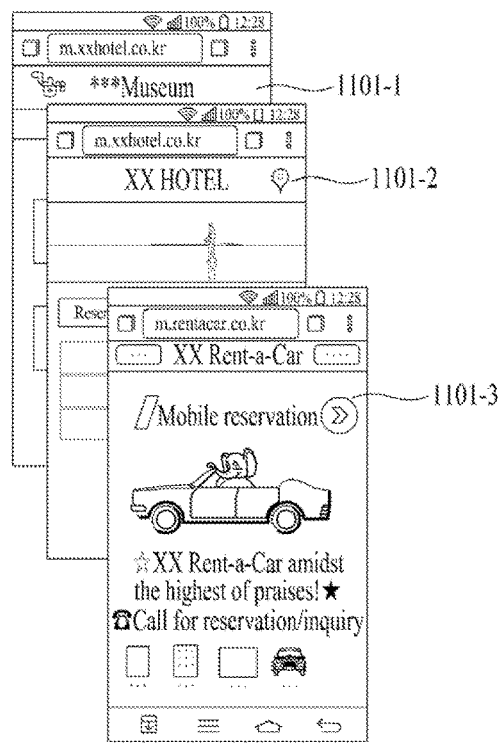

FIG. 14A
FIG. 14B
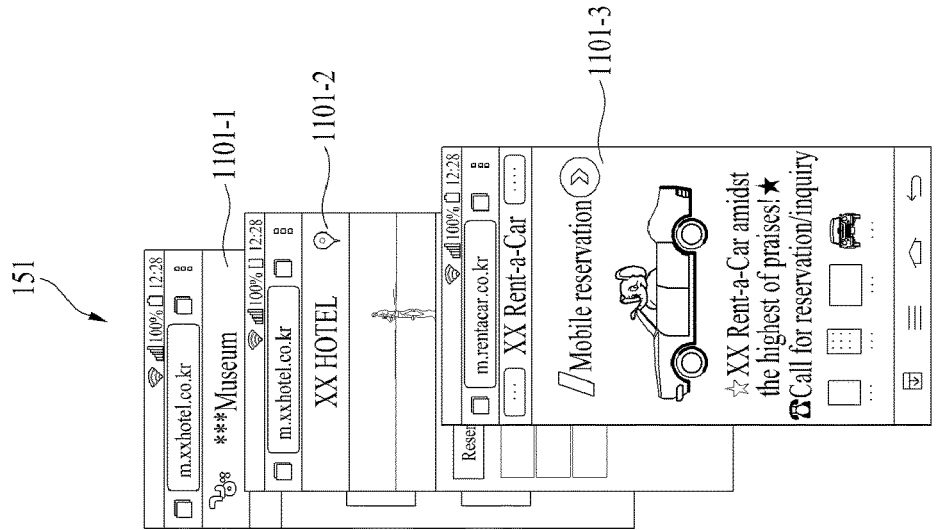
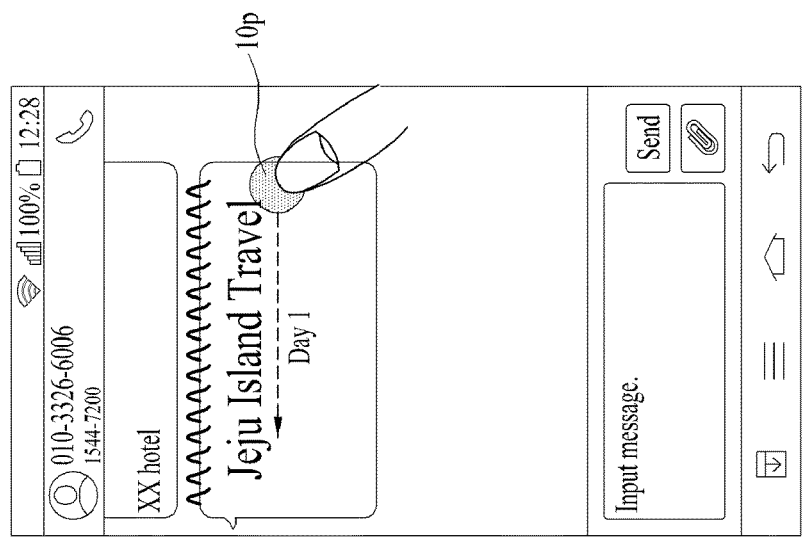

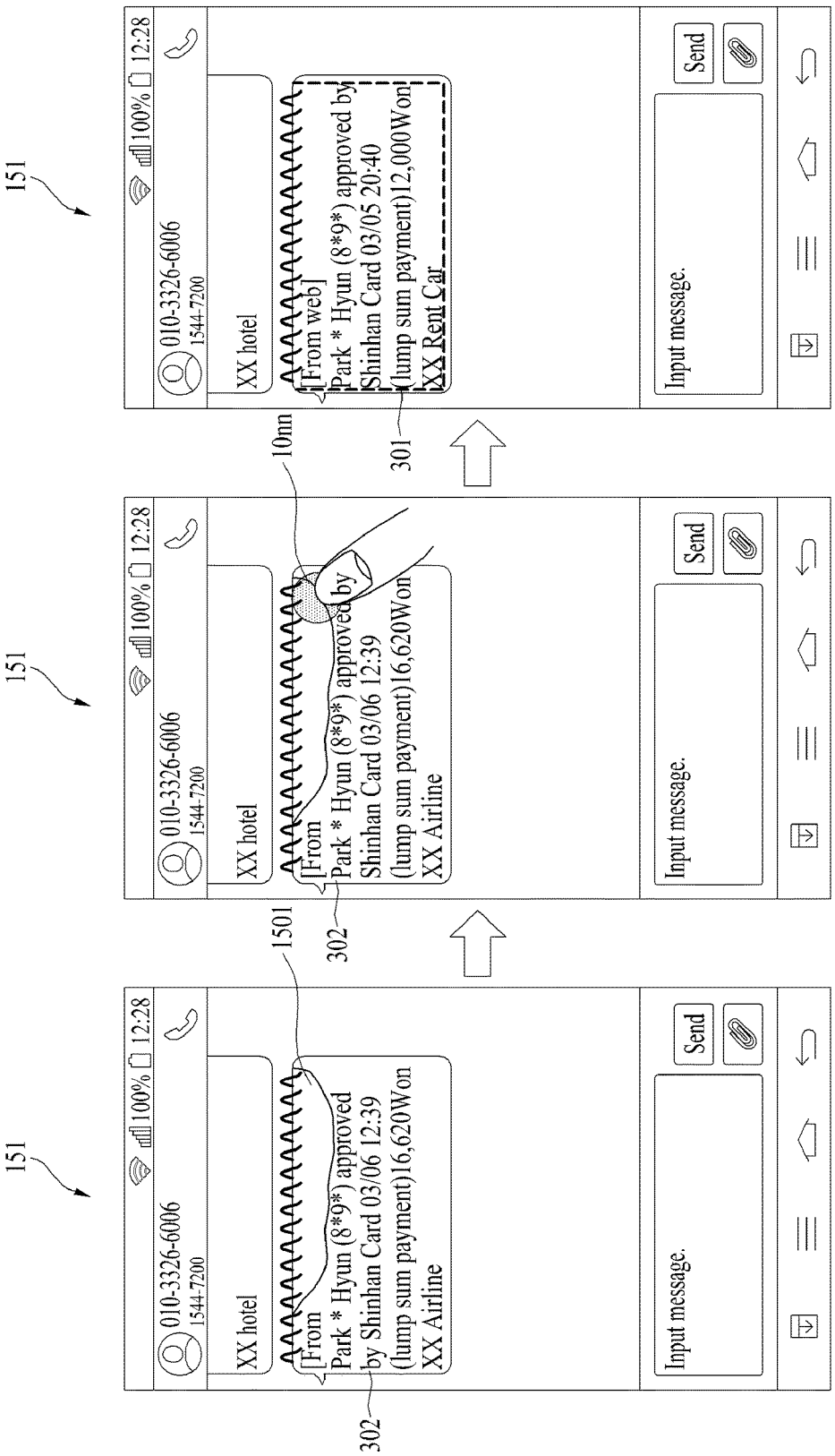

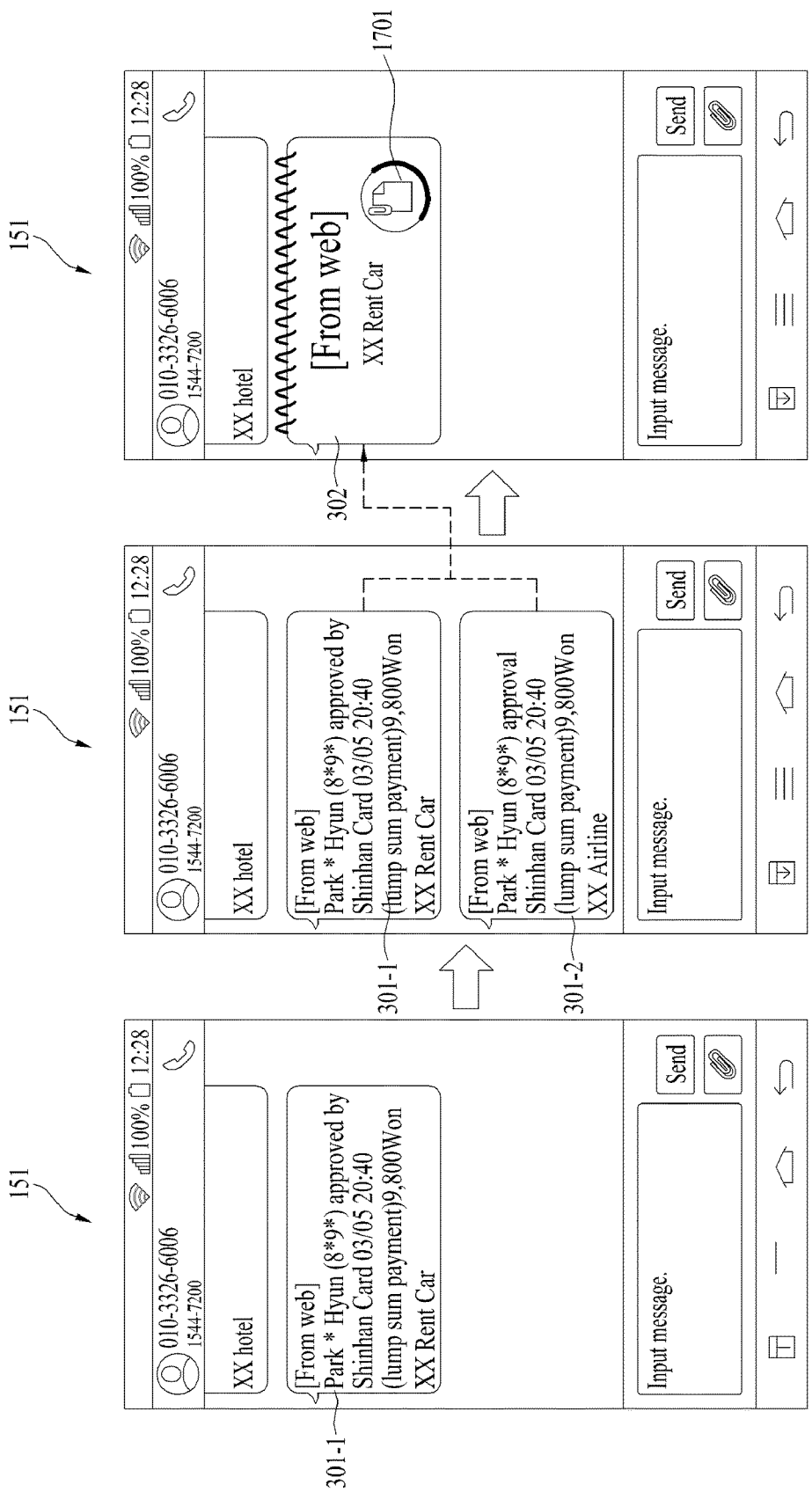

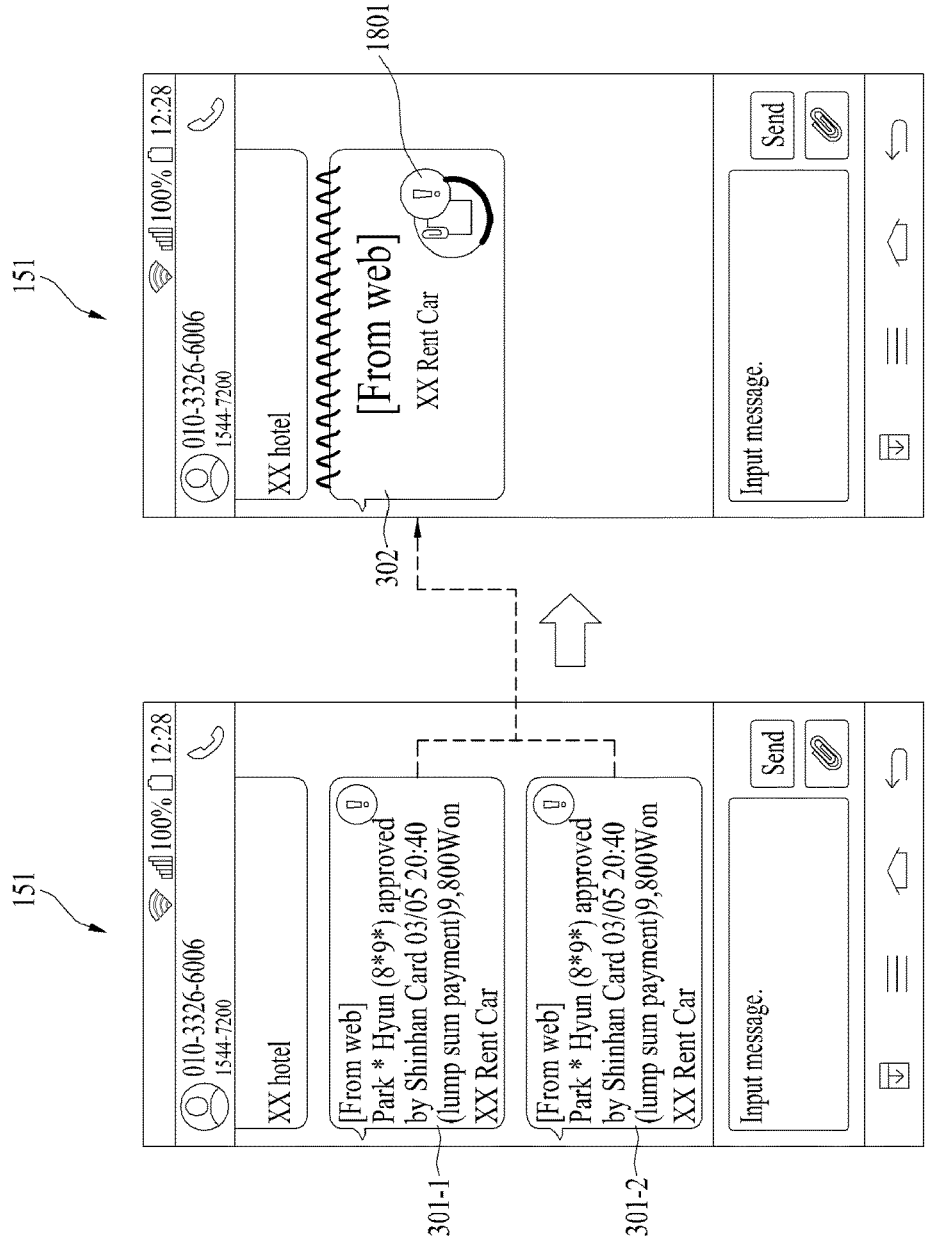

FIG. 19A 010-3326-6006
1544-7200

XX hotel

Jeju Island Travel

Modify cover
Tagging
Reference data

Input message.

Send 1901
1901-1

FIG. 19B 2013-07-25(Thu) | Time | Recommended schedule
Day 1 | 9:00 | Arrival at Jeju airport
| 10:30 | Arrival at accommodatio
| 11:00 | Brunch at Hanlim Port
| 12:16 | Biyang Island
| 15:30 | To Seoguipo from Hanli
| 19:00 | Dinner at Seoguipo
| 20:00 | Lee Jung Seob Street
| 21:00 | Accommodation 2013-07-26(Fri) | Time | Recommended schedule
Day 2 | 7:30 | Move to Moseulpo Port
| 8:30 | Breakfast at Moseulpo P
| 9:00 | Jeju Ole Course
| 12:00 | Move to Seoguipo & Lu
| 14:00 | Jungmoon Tour Comple 10r
10s

FIG. 19C 010-3326-6006
1544-7200

XX hotel

Jeju Island Travel 40 reservations scheduled

Input message.

Send 302
1904

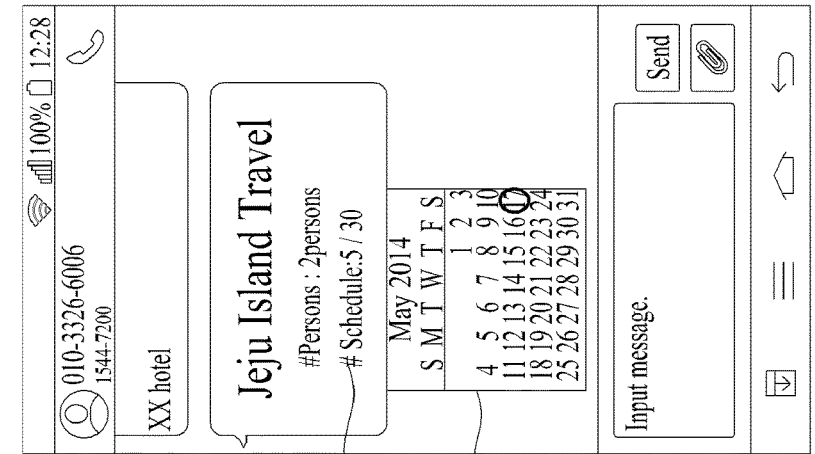
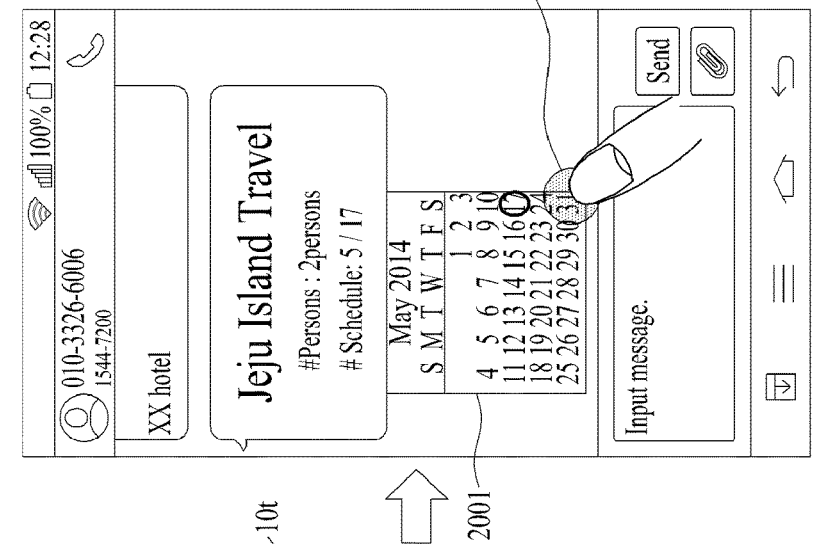
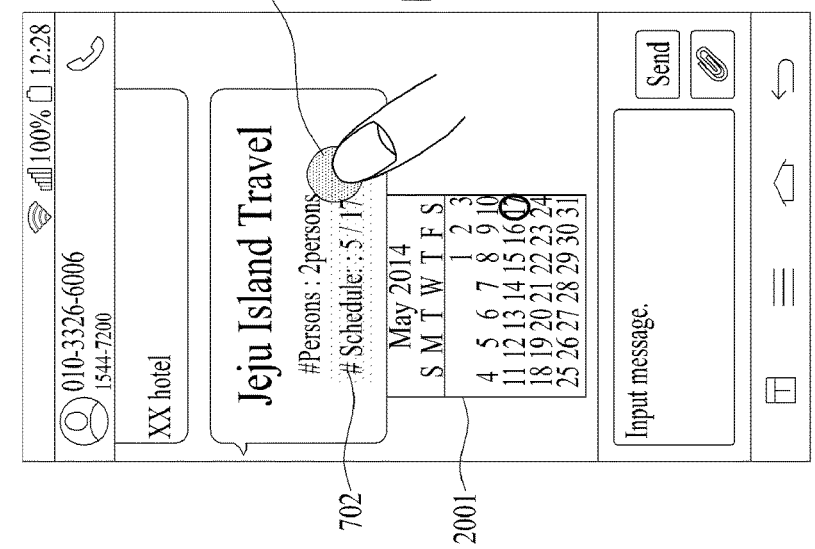

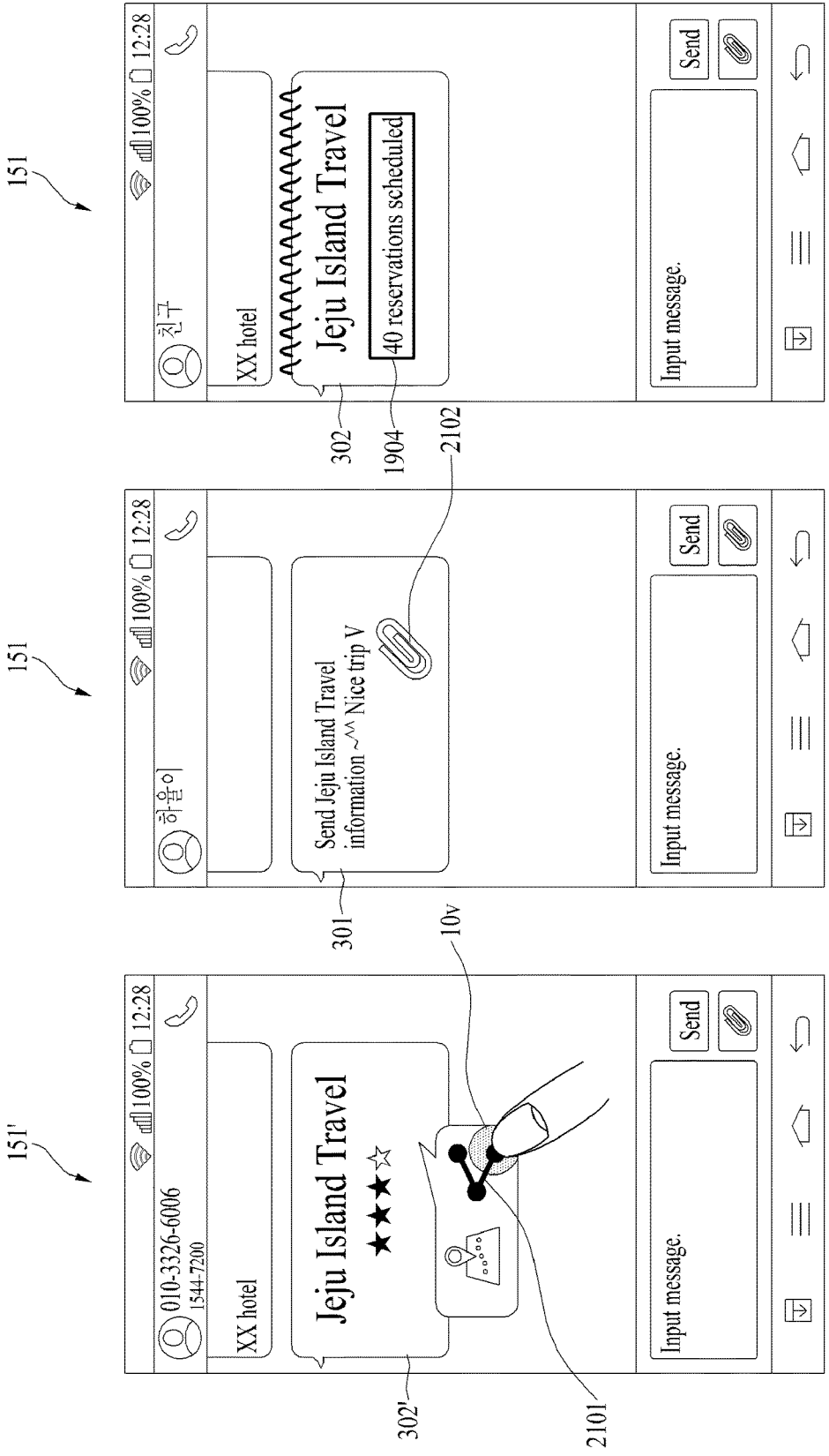

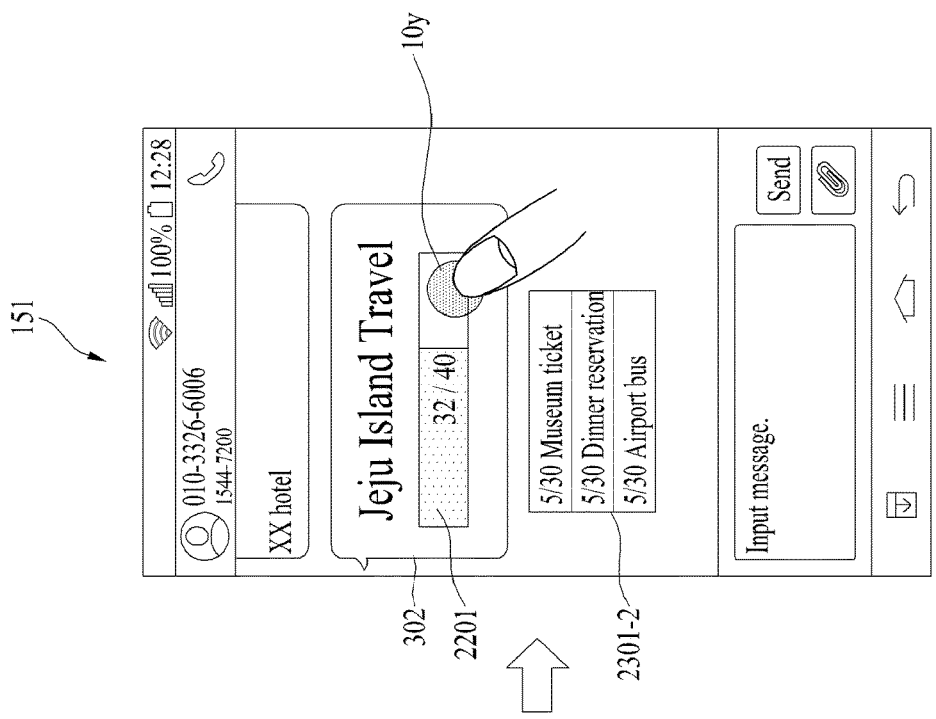
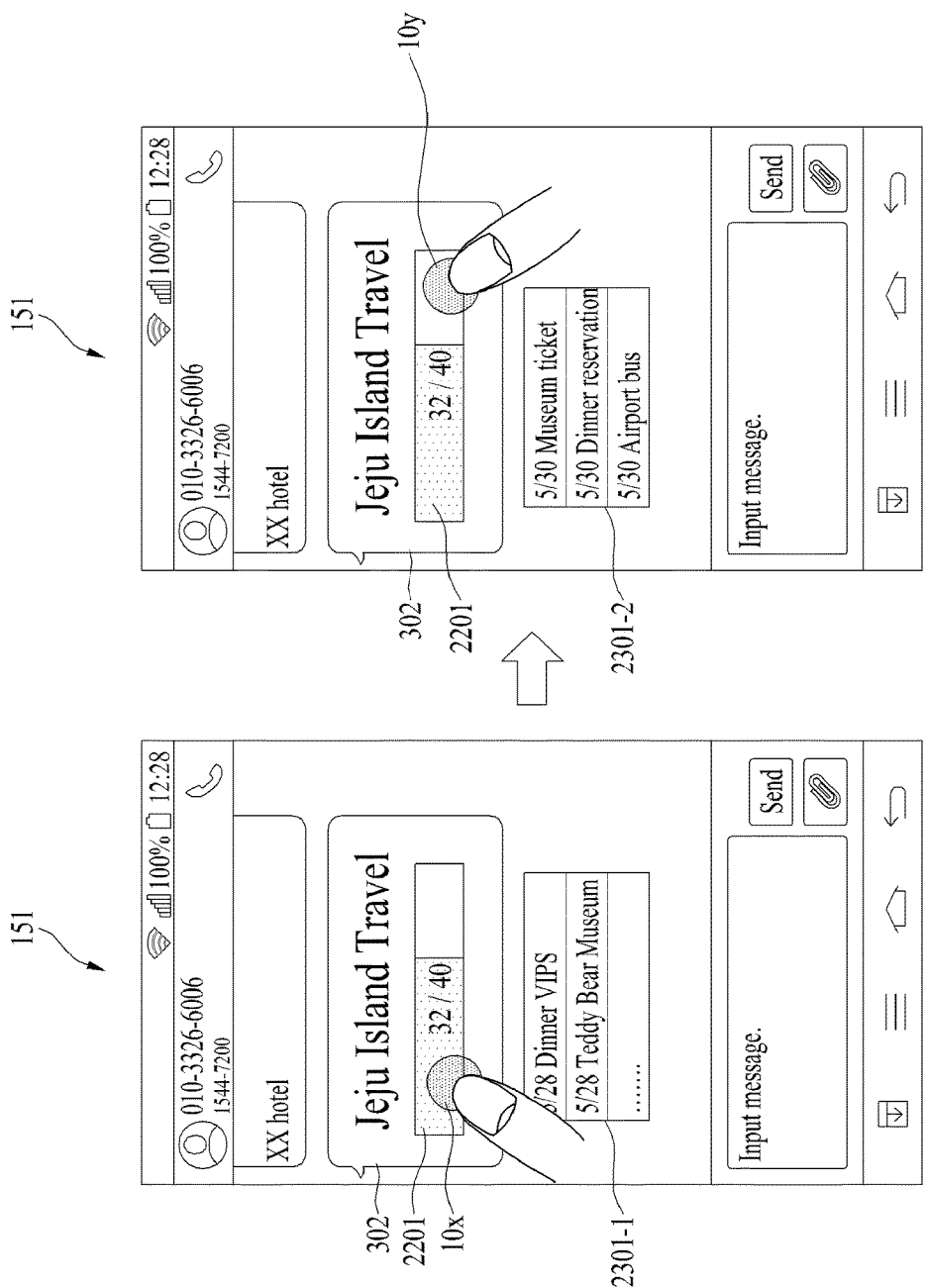

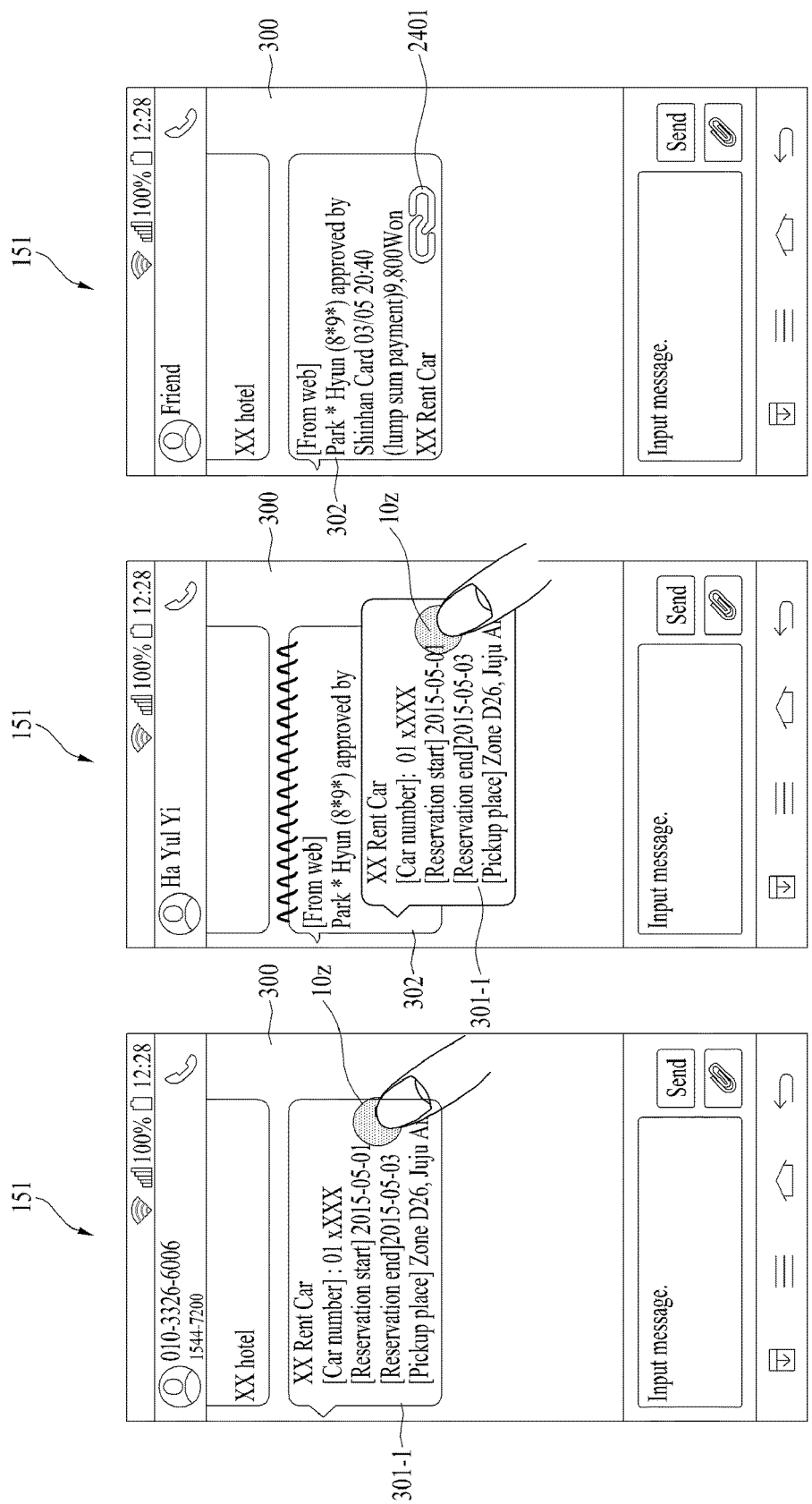

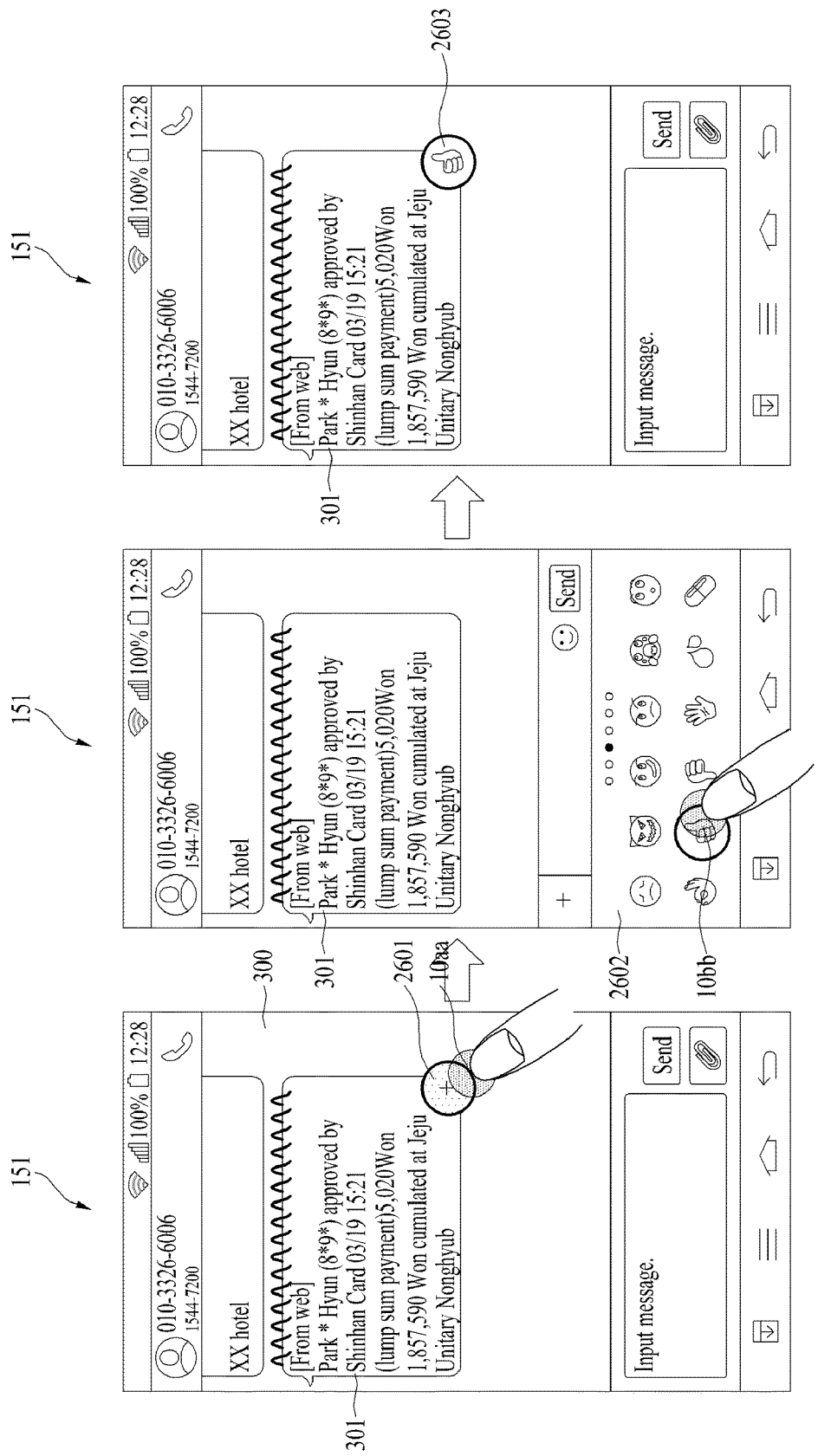

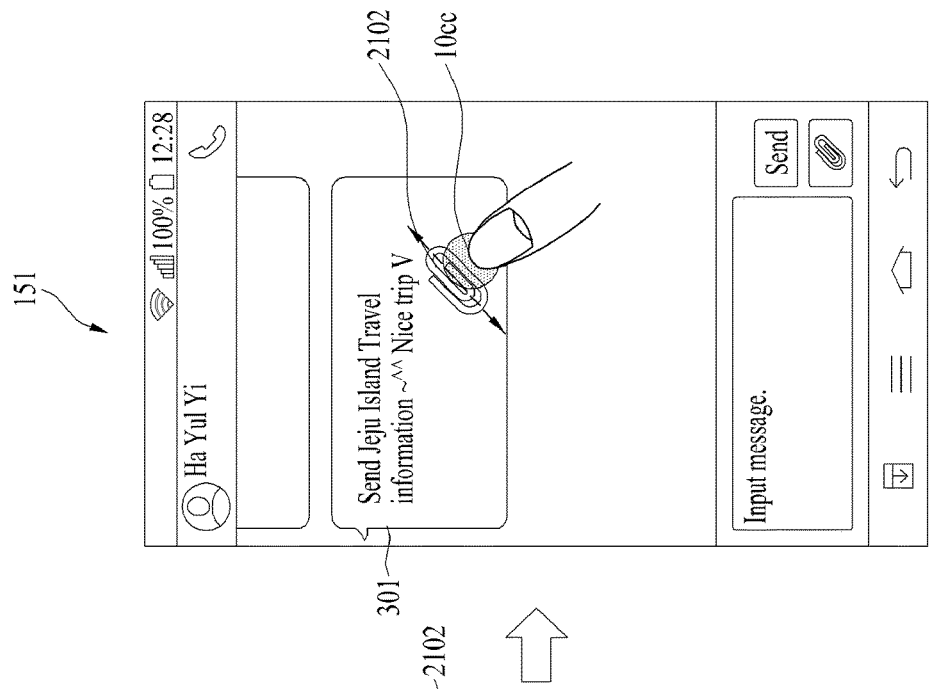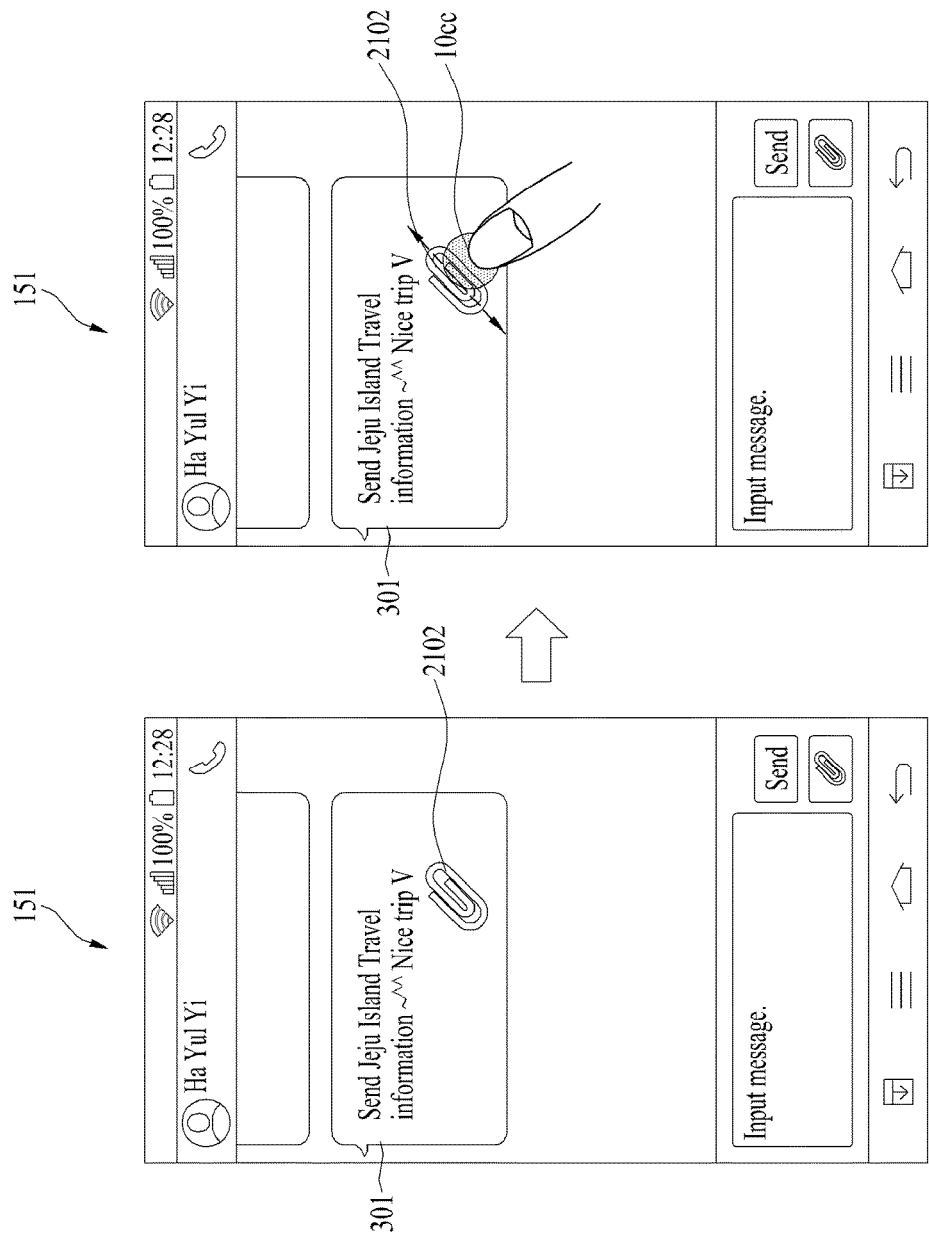

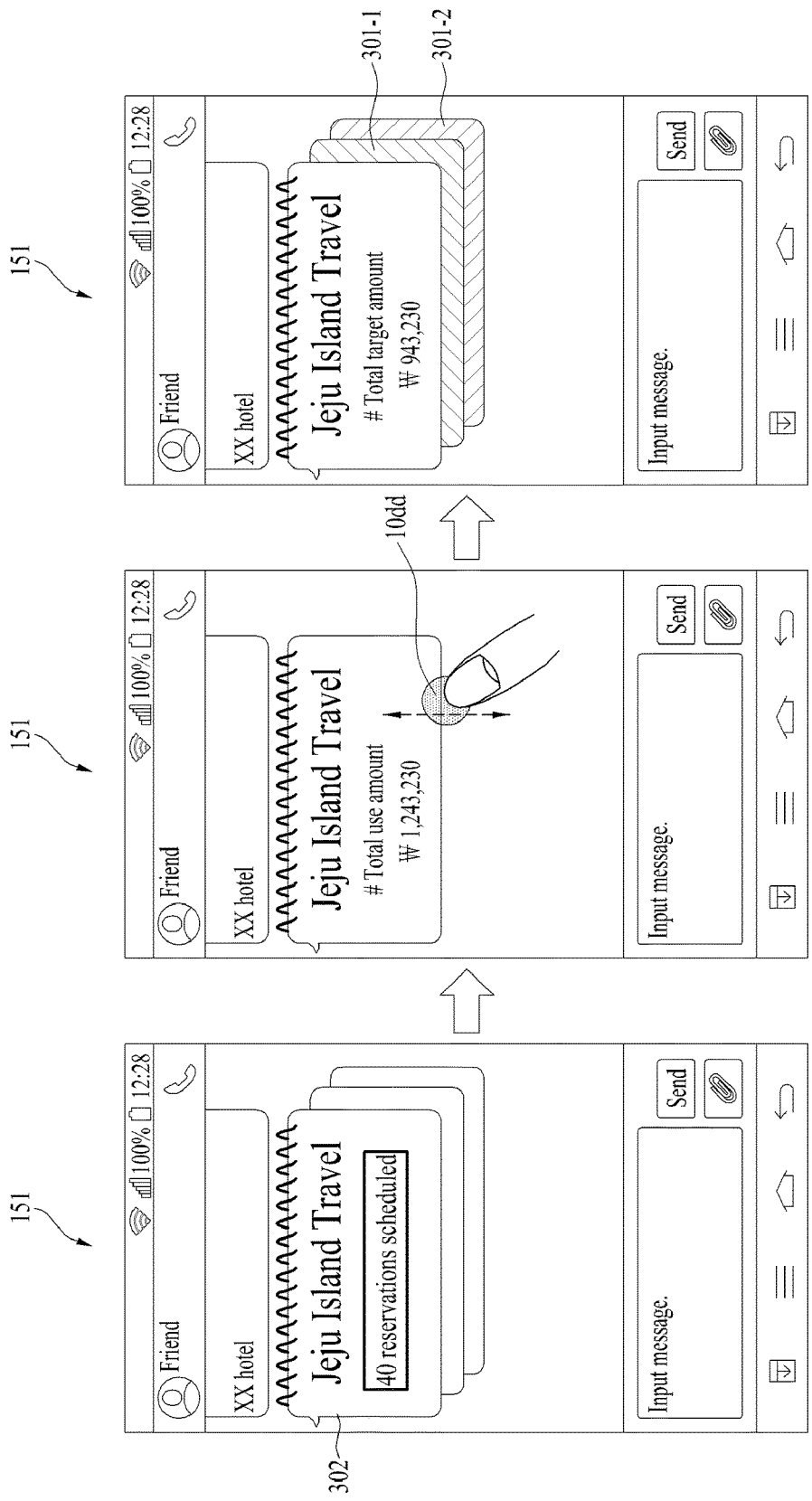

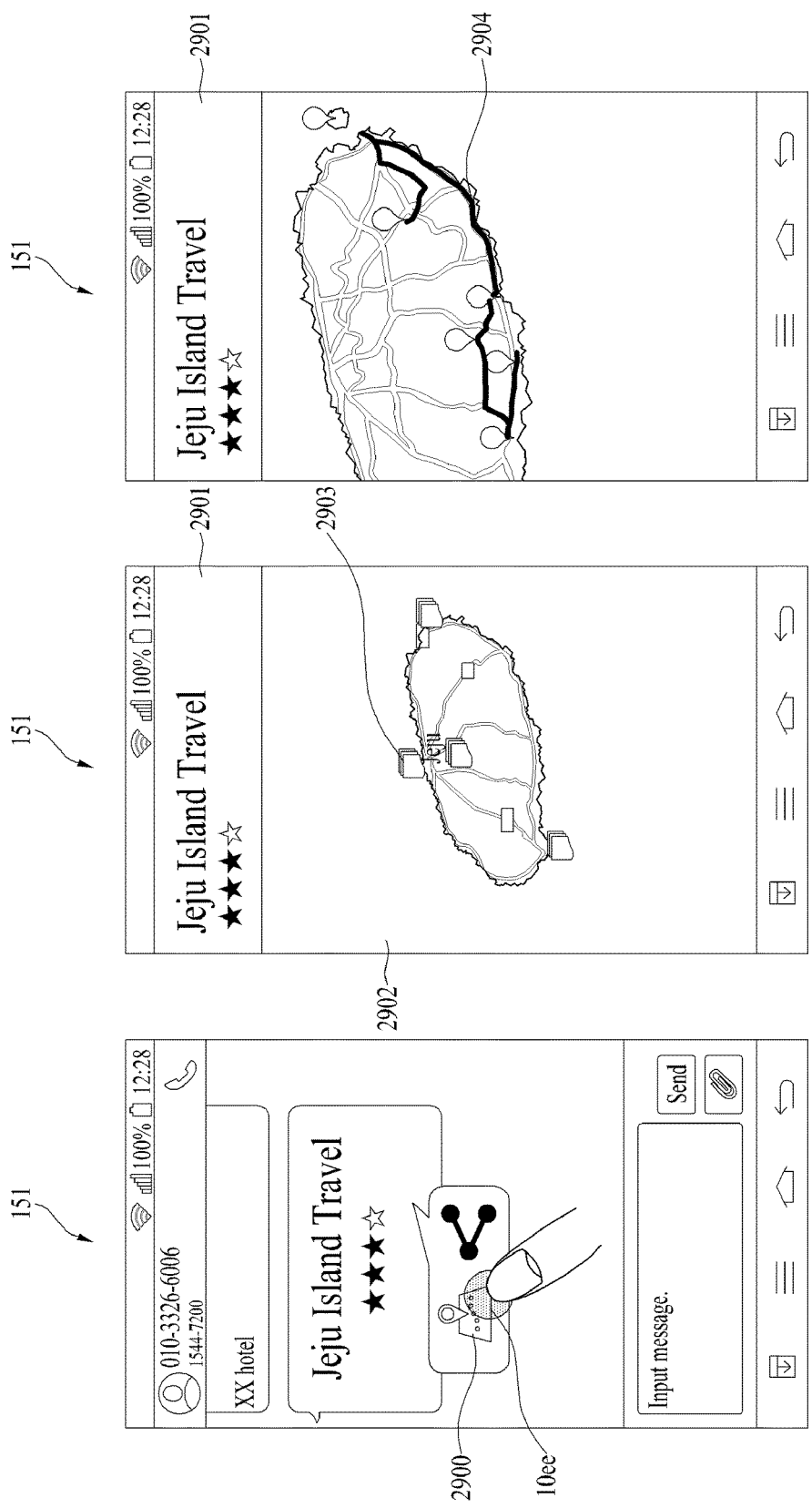

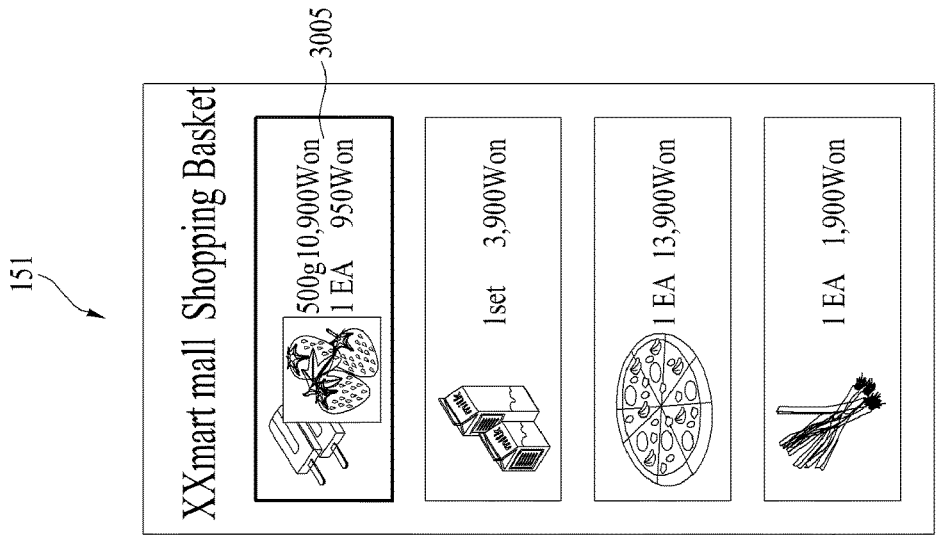
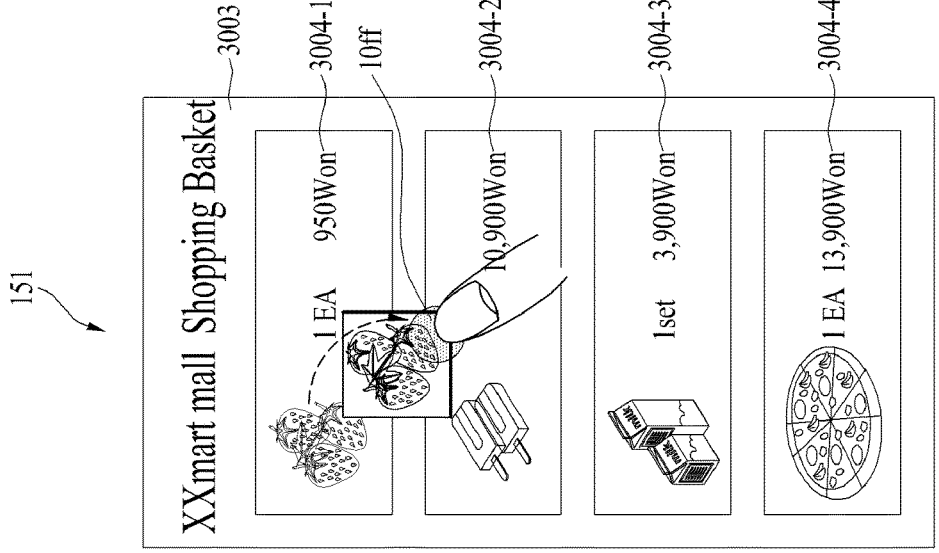
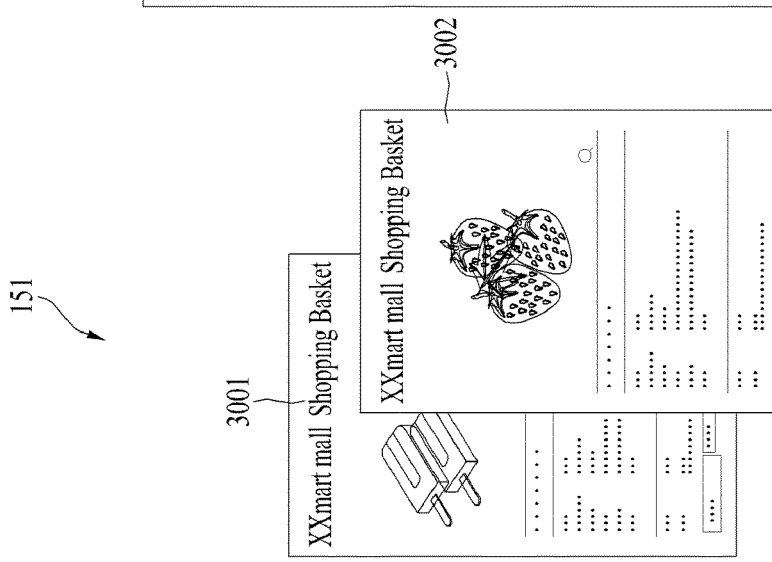

FIG. 33A
FIG. 33B
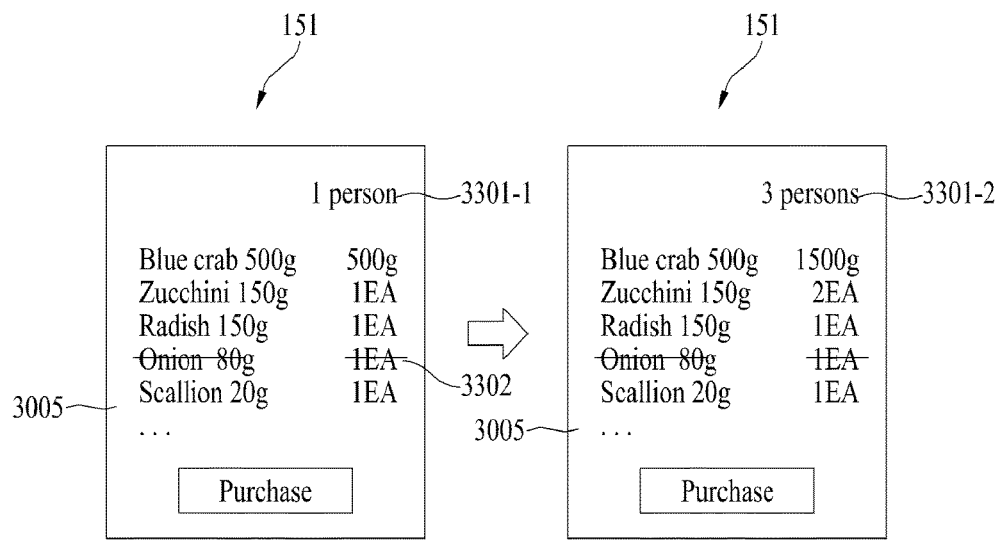
FIG. 34
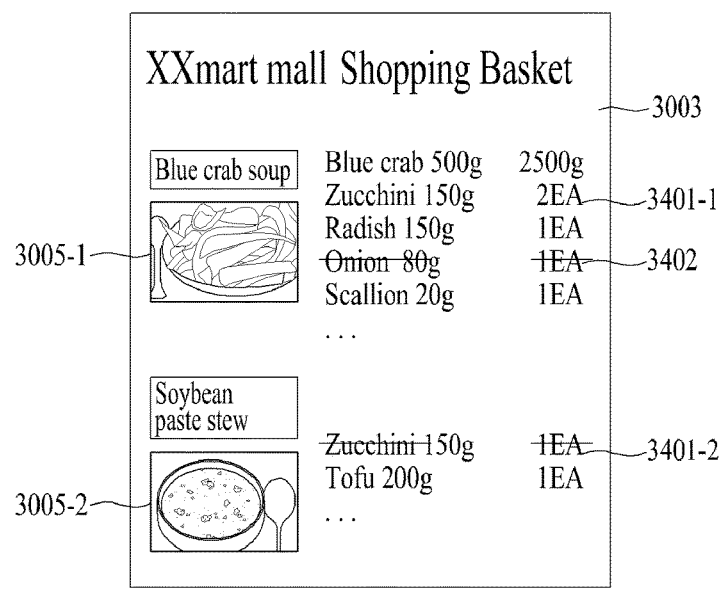

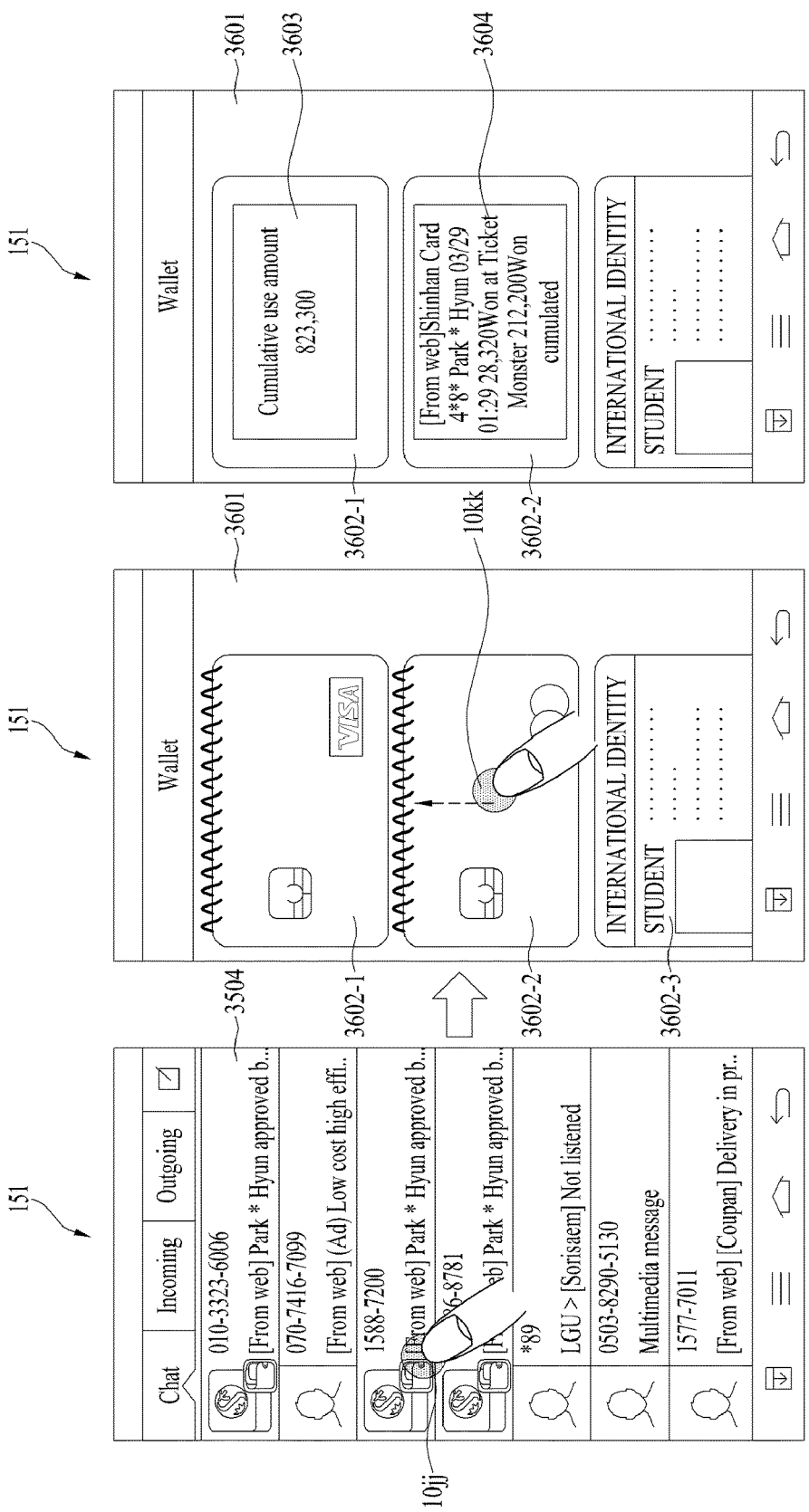

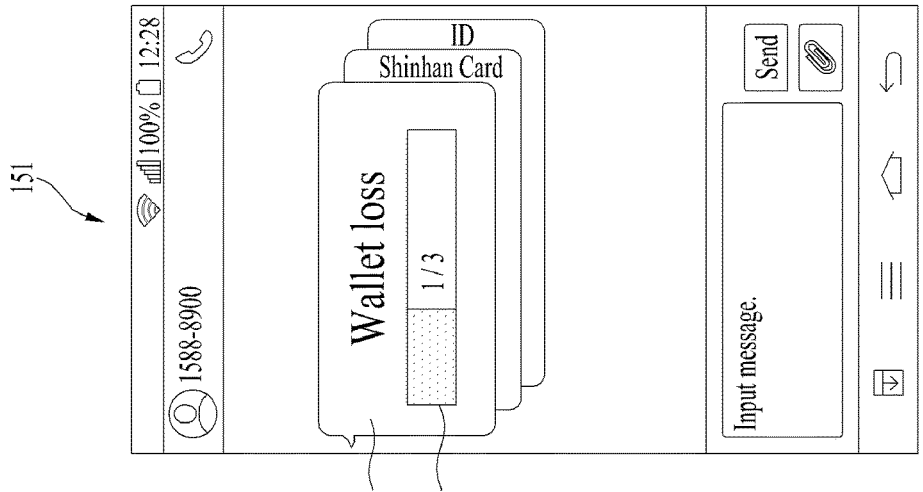
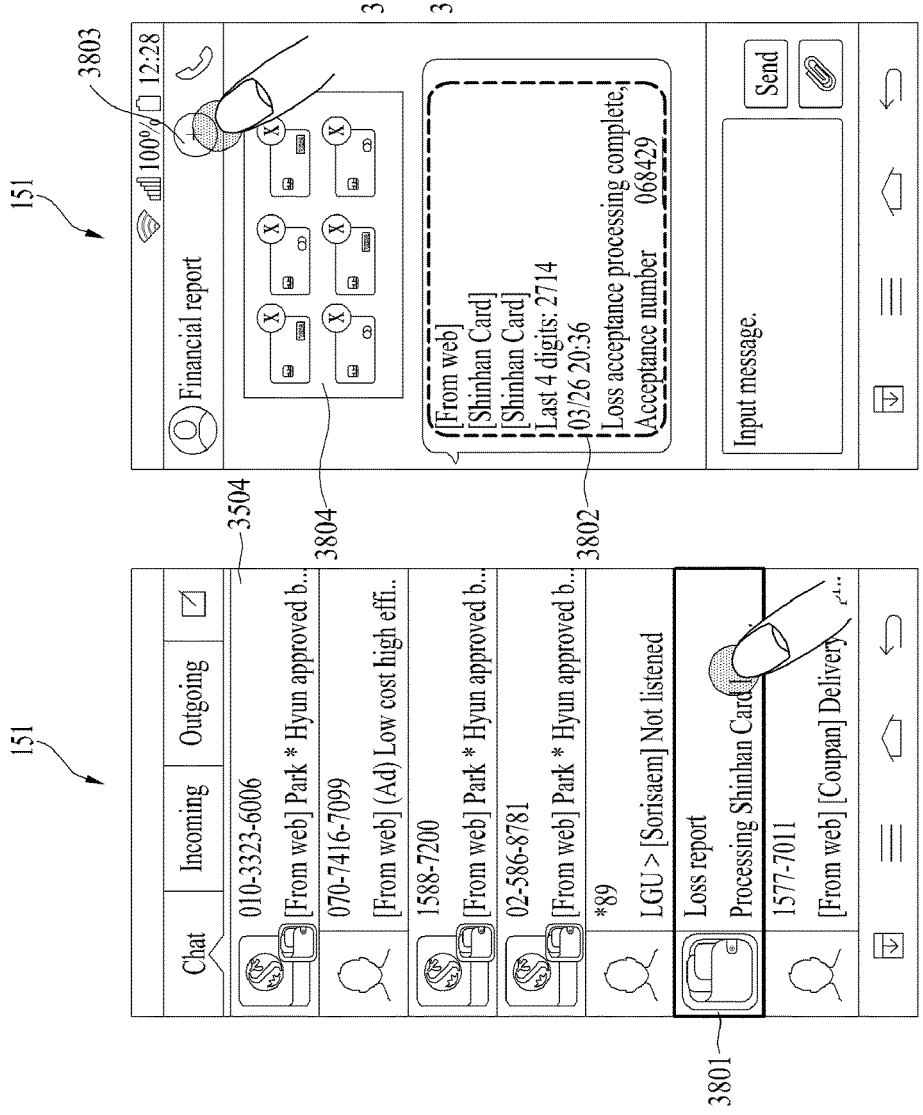

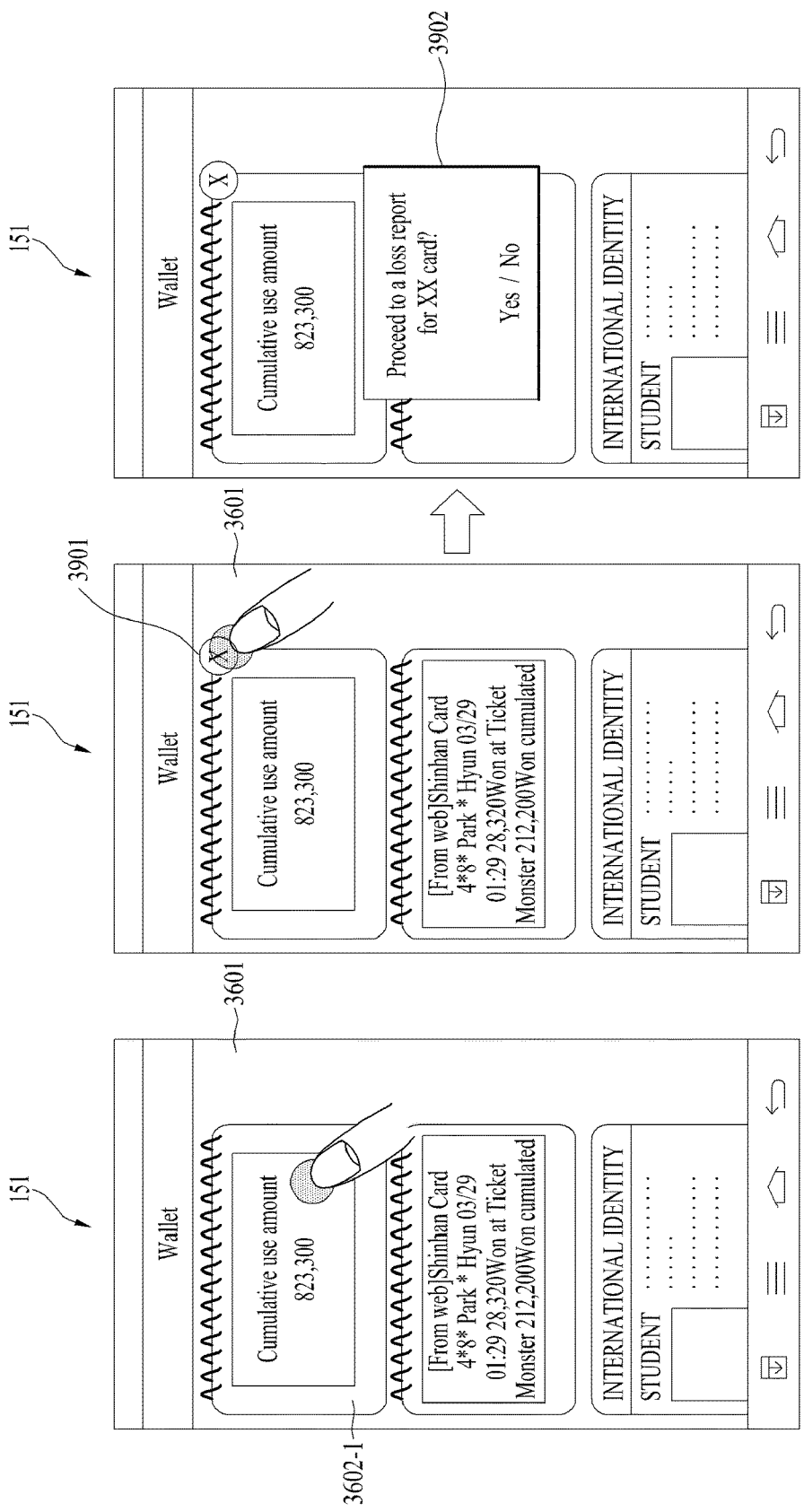

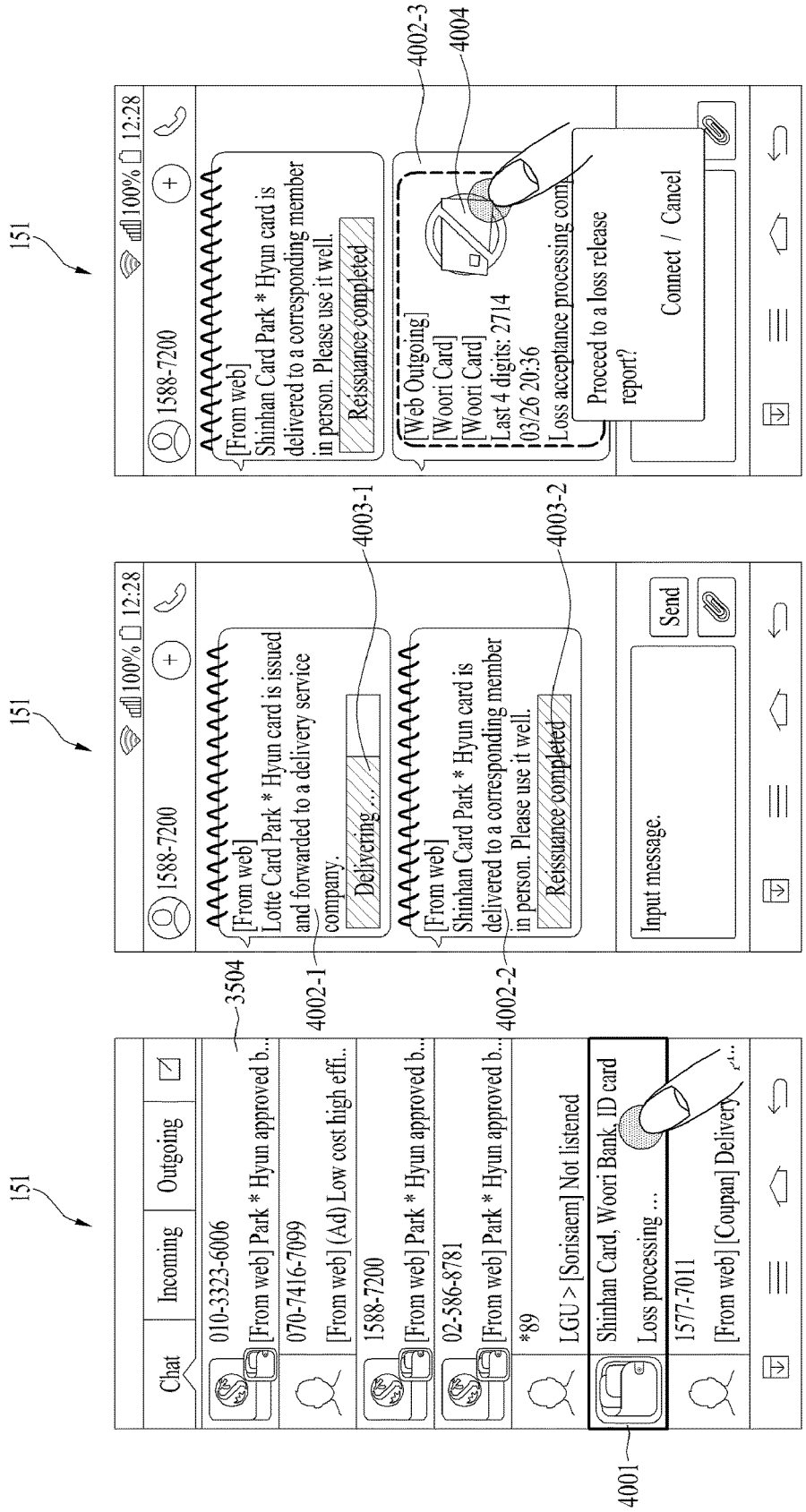

MOBILE TERMINAL AND CONTROLLING METHOD THEREOF

Pursuant to 35 U.S.C. § 119(a), this application claims the benefit of earlier filing date and right of priority to Korean Application No. 10-2015-0067200, filed on May 14, 2015, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating the use of a terminal in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

As a mobile terminal provides various functions, it becomes closely associated with user's daily life. And, the various functions assist a user to facilitate management of daily life. Examples of these functions may include a function of sending a payment report of a credit card, a function of adding an item to a shopping basket in an online shopping mall, and the like.

However, since these functions can be independently managed only but the functions associated with a specific task are not connected to each other organically, it is impossible to manage such functions collectively. Thus, the demands for control methods of managing functions related to user's daily life are increasingly rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a plurality of items can be managed collectively and effectively.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a wireless communication unit configured to transmit/receive messages or data, a user input unit configured to receive a command from a user, a touchscreen, and a controller outputting the received messages through the touchscreen, the controller controlling a prescribed received message among the received messages to be included in a prescribed group, the controller, if a change command for the prescribed group is received through the user input unit, controlling the wireless communication unit to transmit a change request signal corresponding to some messages selected from the received messages included in the prescribed group.

In another aspect of the present invention, as embodied and broadly described herein, a method of controlling a mobile terminal according to another embodiment of the present invention may include the steps of transmitting/receiving messages or data, outputting the received messages through a touchscreen, controlling a prescribed received message among the received messages to be included in a prescribed group, and if a change command for the prescribed group is received, transmitting a change request signal corresponding to some messages selected from the received messages included in the prescribed group.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 2 is a flowchart for a control method of controlling received messages collectively according to one embodiment of the present invention;

FIGS. 4A, 4B and 4C are diagrams for one example of a command for grouping received messages according to one embodiment of the present invention;

FIGS. 6A and 6B are diagrams for a control method of setting a cover (or a title) of a group message 302 according to one embodiment of the present invention;

FIGS. 7A, 7B and 7C are diagrams for a control method of setting an attribute (or a tag) of a group message 302 according to one embodiment of the present invention;

FIGS. 8A, 8B and 8C are diagrams for a control method of directly reading an associated message according to one embodiment of the present invention;

FIGS. 9A, 9B and 9C are diagrams for a control method of automatically totalizing amounts of uses during a tag set period according to one embodiment of the present invention;

FIGS. 12A, 12B, 12C and 12D are diagrams for a control method of collectively cancelling payment message(s) included in a group message 302 according to one embodiment of the present invention;

FIGS. 13A, 13B, 13C, 14A and 14B are diagrams for a control method of collectively cancelling a group message 302 according to one embodiment of the present invention;

FIGS. 15A, 15B, 15C, 16A and 16B are diagrams for a control method of checking a cancelled payment message and making repayment according to one embodiment of the present invention;

FIGS. 17A, 17B and 17C are diagrams for a control method of automatically adding a cancelled payment message to an existing group message 302 according to one embodiment of the present invention;

FIGS. 18A and 18B are diagrams for a control method of warning a case of making redundant payment according to one embodiment of the present invention;

FIGS. 19A, 19B and 19C are diagrams for a control method of making payment easily based on a travel itinerary file saved in advance according to one embodiment of the present invention;

FIGS. 20A, 20B and 20C are diagrams for a control method of changing payment associated with a travel collectively in case of changing a travel itinerary according to one embodiment of the present invention;

FIGS. 21A, 21B and 21C are diagrams for a control method of sharing payment information included in a group message 302 with another user according to one embodiment of the present invention;

FIGS. 23A and 23B are diagrams for a control method of checking a reservation status easily based on a touch input to a reservation status progressive bar 2201 on a group message 302 according to one embodiment of the present invention;

FIGS. 24A, 24B and 24C are diagrams for a control method of grouping a received reservation information message 301-1 with a payment message according to one embodiment of the present invention;

FIGS. 26A, 26B and 26C are diagrams for a control method of inputting user's evaluation to a received message according to one embodiment of the present invention;

FIGS. 27A and 27B are diagrams for a control method of deleting and editing a schedule information received from a counterpart terminal according to one embodiment of the present invention;

FIGS. 28A, 28B and 28C are diagrams for a control method of sorting and controlling messages in a group message 302 according to one embodiment of the present invention;

FIGS. 29A, 29B and 29C are diagrams for a control method of checking a payment information through a map according to one embodiment of the present invention;

FIGS. 30A, 30B, 30C, 31A, 31B, 32A and 32B are diagrams for a control method of managing items supposed to be purchased on an online store by groups according to one embodiment of the present invention;

FIGS. 33A and 33B are diagrams for a control method of effectively purchasing material required for a prescribed food in accordance with the number of persons based on recipe information according to one embodiment of the present invention;

FIG. 34 is a diagram for a control method of automatically deleting sources redundantly included in a plurality of dishes using recipe information according to one embodiment of the present invention;

FIGS. 35A, 35B, 35C, 36A, 36B, 36C, 37A, 37B and 37C are diagrams are diagrams for a control method of collectively making a theft/loss report using a wallet management application according to one embodiment of the present invention;

FIGS. 38A, 38B and 38C are diagrams for a control method of making loss reports for a plurality of cards effectively according to one embodiment of the present invention;

FIGS. 39A, 39B and 39C are diagrams for a control method of making a loss report on an outputted card list 3601 according to one embodiment of the present invention;

FIGS. 40A, 40B and 40C are diagrams for a control method of managing a message related to a loss report collectively according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
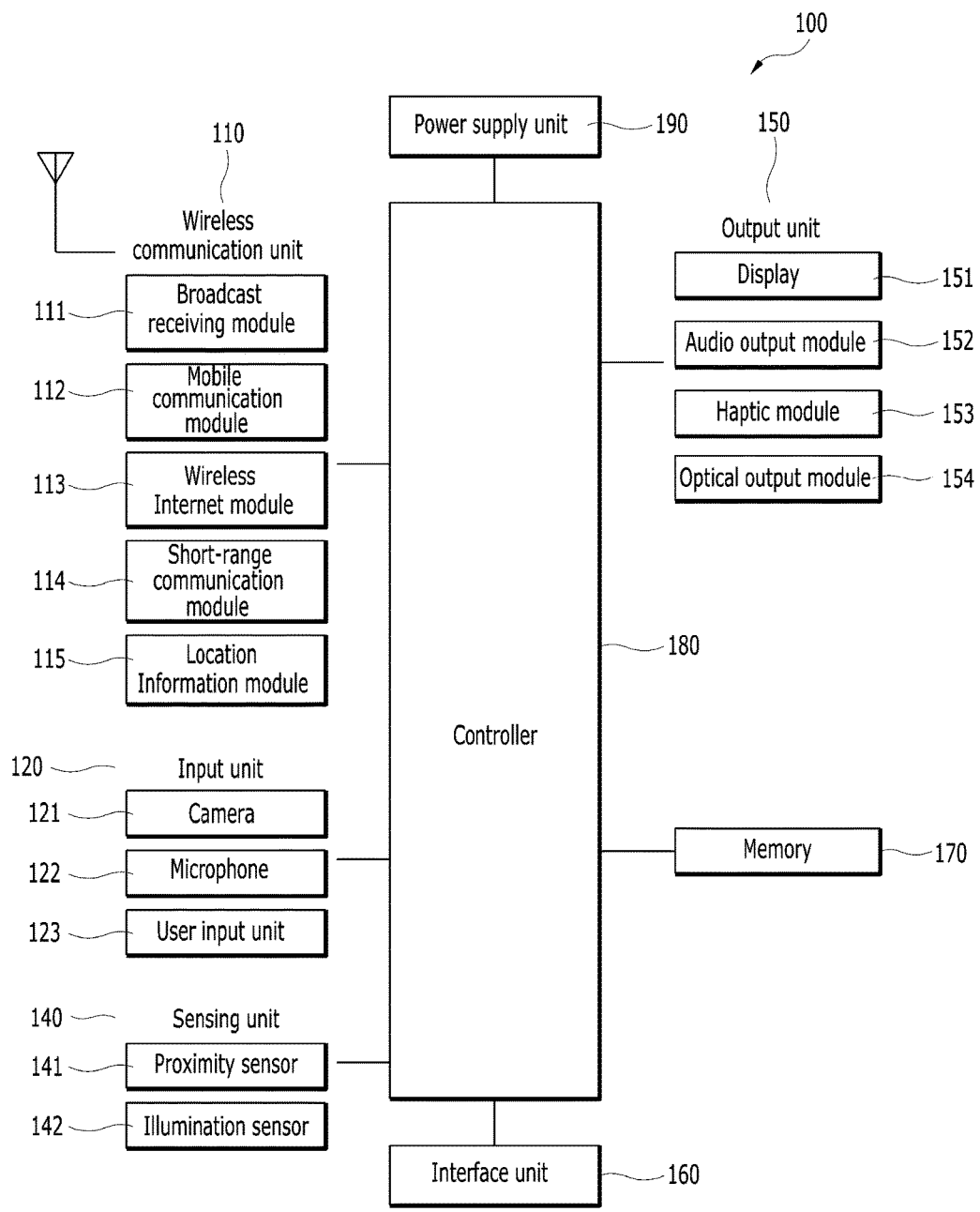
FIG. 1A is a block diagram of a mobile terminal in accordance with the present disclosure.
Figure 1B:
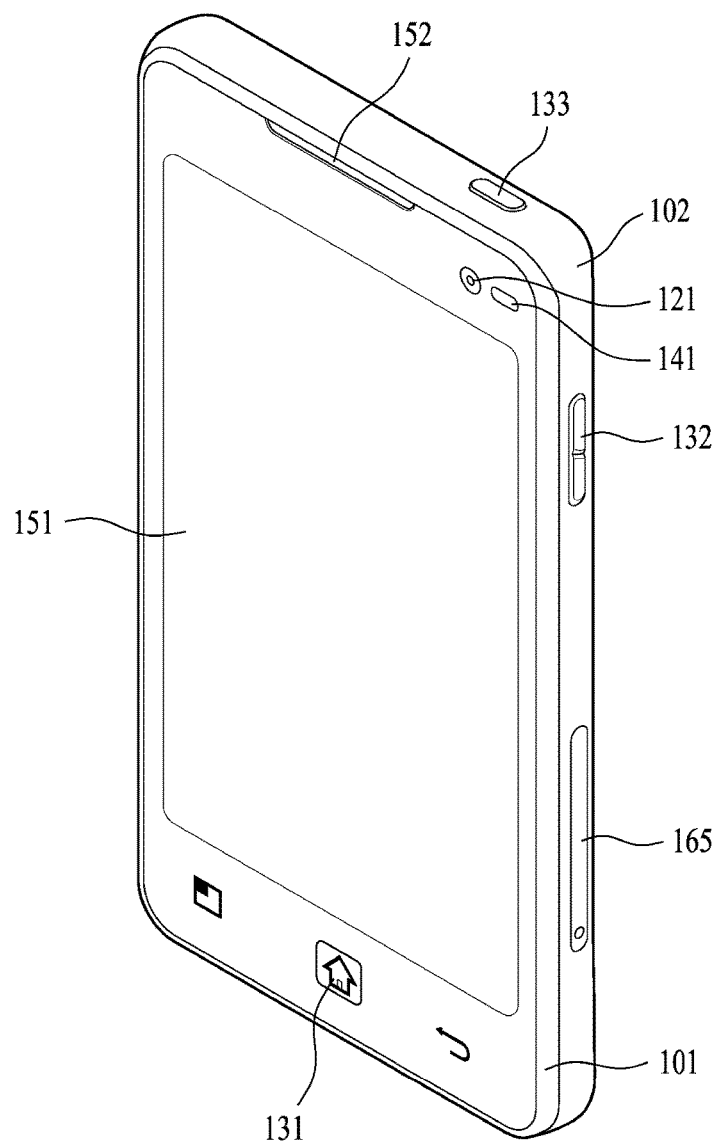
FIGS. 1B and 1C are conceptual views of one example of the mobile terminal, viewed from different directions.
Figure 1C:
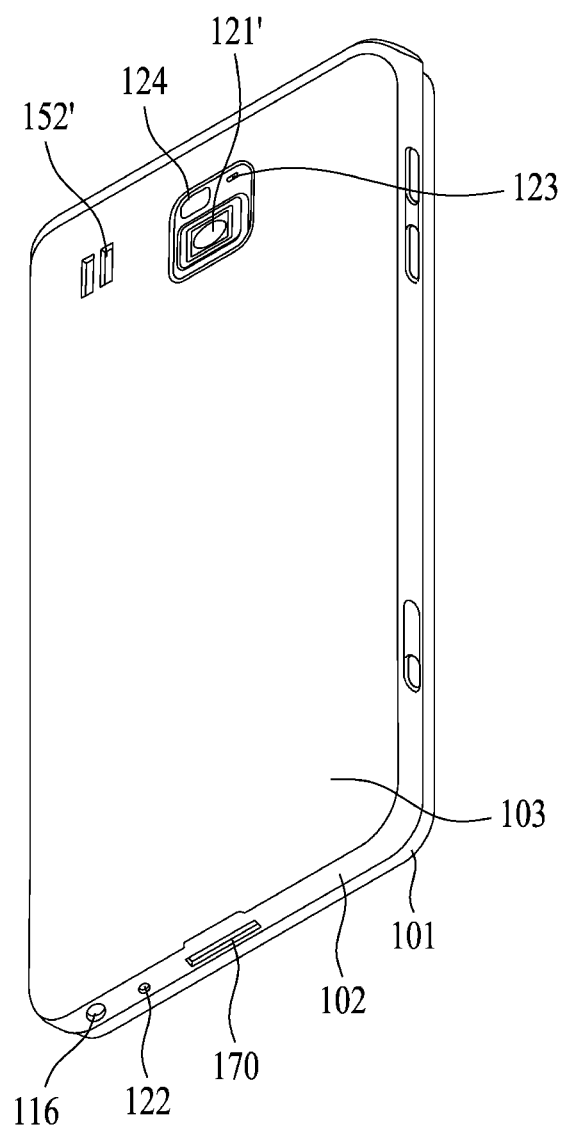

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, informations and the like inputted or outputted through the above-mentioned components and/or runs application programs saved in the memory 170, thereby processing or providing a user with appropriate informations and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the 1st audio output unit 152a, the 2nd audio output unit 152b, the proximity sensor 141, the illumination sensor 142, the light output unit 154, the 1st camera 121a, the 2nd camera 121b, the 1st manipulating unit 123a, the 2nd manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

According to one embodiment of the present invention, it is intended to provide a control method of collectively managing messages received in association with a specific task or business. According to an embodiment of the present invention, messages may include SMS (short messaging service) message, MMS (Multimedia messaging service) message, LMS (Long messaging service) message, and a message received using a text transceiving application based on data communication. According to the following detailed description of one embodiment of the present invention, a message (hereinafter named a payment message) received on a monetary payment of a card use or the like is taken as one example, by which the present invention is non-limited.

According to one embodiment of the present invention, if a payment message related to a specific task or business (e.g., a travel, a business trip, etc.) is received, it is proposed to manage the received payment message by a group. And, it is proposed that payment messages managed by the group can be adjusted for cancellation/change/number of persons. Embodiments of the present invention shall be described in detail with reference to the accompanying drawings as follows.

FIG. 2 is a flowchart for a control method of controlling received messages collectively according to one embodiment of the present invention.

Referring to FIG. 2, in a step S201, the controller 180 receives a message through the wireless communication unit 110. In a step S202, the controller 180 may output a chat window for the received message. In particular, the chat window may include a message history including the received message. In a step S203, a plurality of messages can be grouped into a prescribed group (i.e., grouping into a prescribed group). The steps S201 to S203 are described in detail with reference to the configuration diagrams shown in FIGS. 3A, 3B and 3C as follows.

Figure 3A:
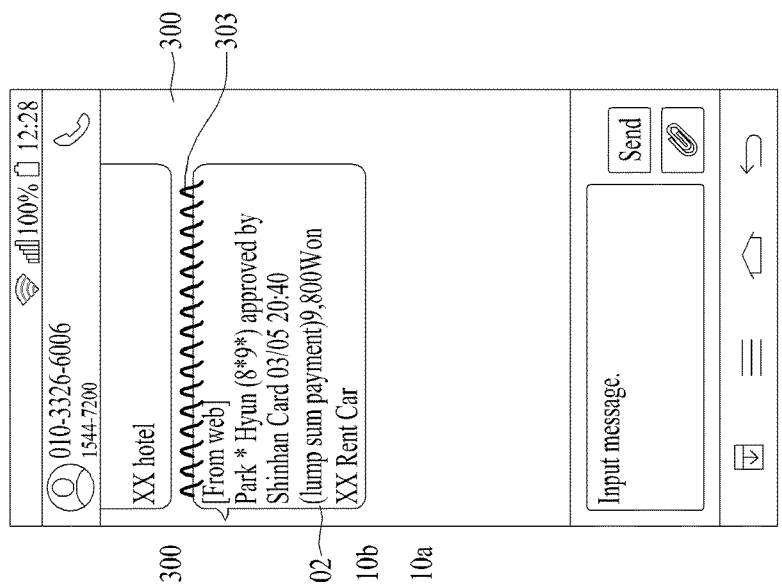
FIGS. 3A, 3B and 3C are diagrams for a control method of grouping an output of a chat window and received messages included in the chat window together according to one embodiment of the present invention.
Figure 3B:
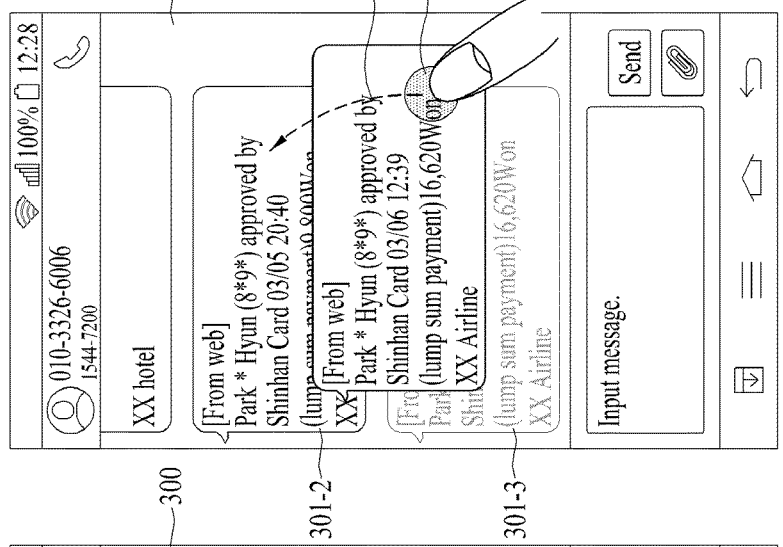
Figure 3C:
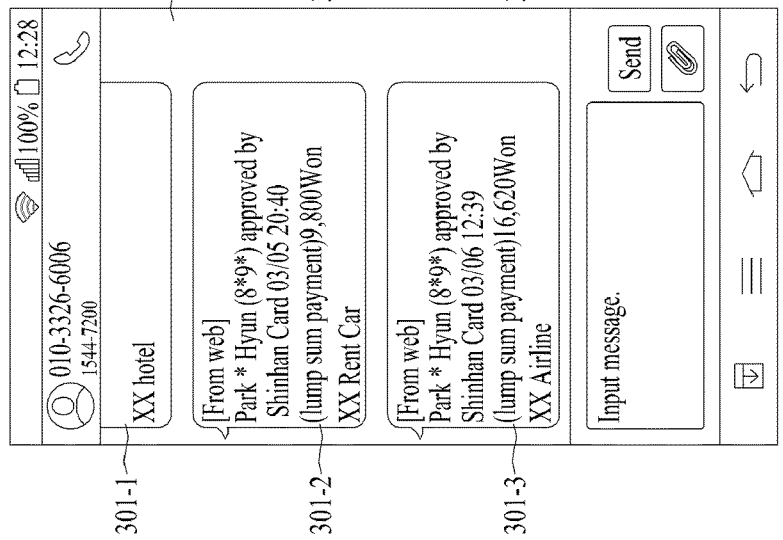

FIGS. 3A, 3B and 3C are diagrams for a control method of grouping an output of a chat window and received messages included in the chat window together according to one embodiment of the present invention.

Referring to FIG. 3A, the controller 180 outputs the chat window 300 in the step S202. In this case, the outputted chat window 300 may include a history of at least one received message received in the step S201. According to the example shown in FIG. 3, the chat window 300 includes a $1^{st}$ payment message 301-1, a $2^{nd}$ payment message 301-2 and a $3^{rd}$ payment message 301-3.

According to one embodiment of the present invention, the payment message may include a card payment information. In this case, the card payment information may mean the information sent to a user by a corresponding card company in case of making a payment using a card and may include at one of informations such as an amount of a corresponding payment, a used time of the corresponding payment, a used place of the corresponding payment, an approval/cancellation of the corresponding payment, and the like.

The $2^{nd}$ payment message 301-2 shown in FIG. 3 is taken as an example for the following description. First of all, the $2^{nd}$ payment message 301-2 includes a card payment information indicating that a card use amount '9,800 Won' for a card used place 'XX Rent Car' is used on 20:40, March 5 by a card company 'Shinhan Card™'.

According to one embodiment of the present invention, if a command for grouping a plurality of messages is received, the controller 180 combines a plurality of the messages into a single display object and is then able to output the single display object. In this case, referring to FIG. 3B, one example of the command for grouping a plurality of the messages may include an input applied in a manner of applying a touch 10a to a prescribed message (e.g., a 3rd payment message 301-3) and the applying a drag 10b to another message (e.g., a 2nd payment message 301-2) by maintaining the touch 10a.

Referring to FIG. 3C, a 2nd payment message 301-2 and a 3rd payment message 301-3 combined into a single group and the single group 302 is outputted through a chat window 300. In the following description of one embodiment of the present invention, this combined and outputted message shall be named a group message 302. And, an indicator 303 indicating that this is a group message can be further outputted through the group message 302. According to the example shown in the drawing, one example of the indicator 303 is outputted as a spring shape through the group message 302.

Meanwhile, another example of a command for grouping a plurality of messages is described in detail with reference to FIGS. 4A, 4B and 4C as follows.

FIGS. 4A, 4B and 3C are diagrams for one example of a command for grouping received messages according to one embodiment of the present invention.

In FIGS. 4A-4C, when a specific payment message is received, it is proposed to output a guide line for grouping another group.

Referring to FIG. 4A, as mentioned in the foregoing description, a chat window 300 is currently outputted. And, 1st to 3rd payment messages 301-1 to 301-3 are included in the chat window 300. In response to a reception of the 3rd payment message 301-3, the controller 180 can output a 1st guide line 401-1 and a 2nd guide line 401-2 to perform groupings on the 1st payment message 301-1 and the 2nd payment message 301-2, respectively.

As a user applies a touch 10c to the 1st guide line or the 2nd guide line, a grouping can be performed on a corresponding group.

In particular, referring to FIG. 4B, if an input of applying the touch 10c to the 1st guide line 401-1 is received, the controller 180 can control the received 3rd payment message 301-3 to be included in the group corresponding to the 1st guide line 401-1.

Subsequently, referring to FIG. 4C, a group message 302 including the 3rd payment message 301-3 may be outputted to the chat window 300.

In this case, the group message 302 may be used as a control method for managing received messages collectively. In the following description, a control method of reading messages included in the group message 302 is described in detail with reference to FIGS. 5A, 5B and 5C.

Figure 5A:
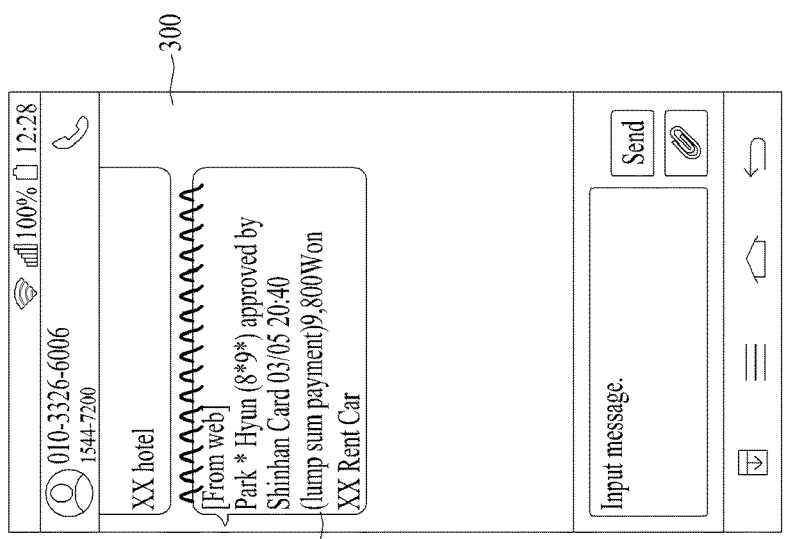
FIGS. 5A, 5B and 5C are diagrams for a control method of reading each message included in a group message 302 according to one embodiment of the present invention.
Figure 5B:
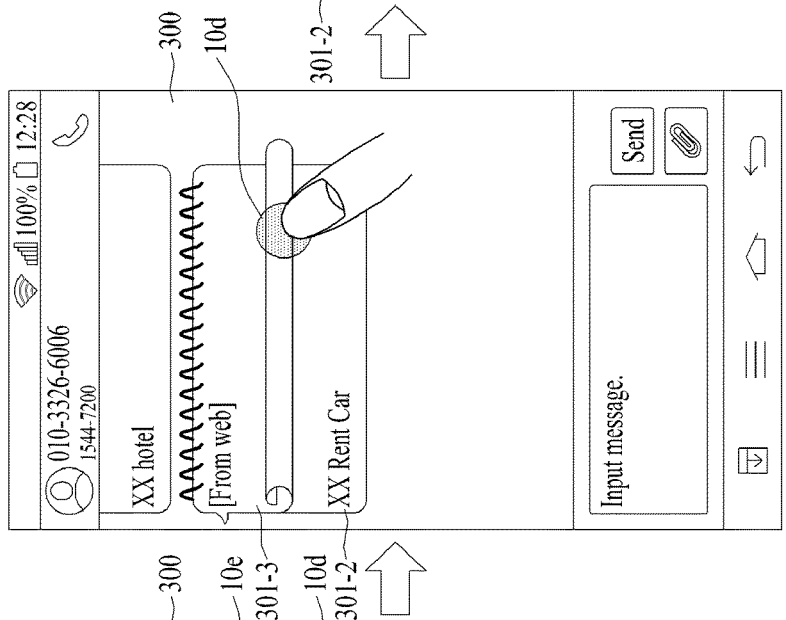
Figure 5C:
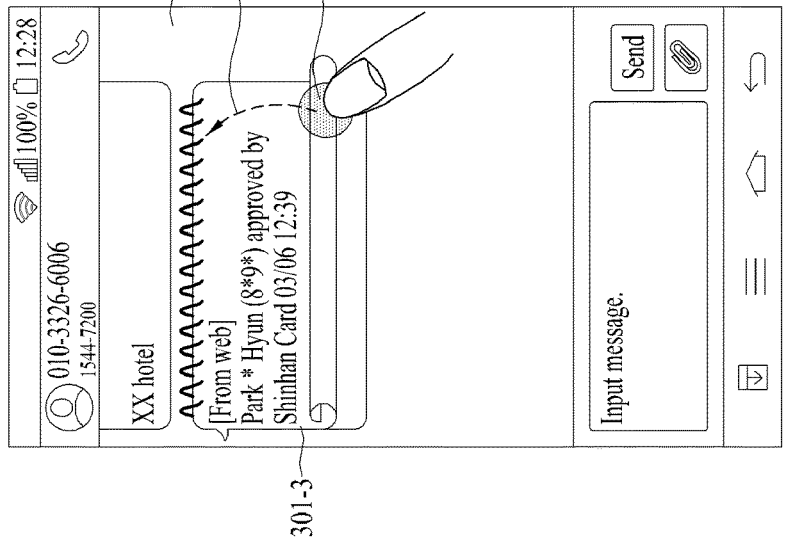

FIGS. 5A, 5B and 5C are diagrams for a control method of reading each message included in a group message 302 according to one embodiment of the present invention.

Referring to FIG. 5A, the controller 180 currently outputs a chat window 300. And, the chat window 300 includes a group message 302. If a touch gesture is applied to the group message 302, the controller 180 can sequentially output message(s) included in the group message 302. For instance, if an input of applying a touch 10d to the group message 302 and then applying a drag 10e in a top direction by maintaining the touch 10d is received, referring to FIG. 5C, the controller 180 switches a 3rd payment message 301-3 to a 2nd payment message 301-2 and then outputs the 2nd payment message 301-2. In doing so, while the drag 10e is applied in the top direction by maintaining the touch 10d, the controller 180 can further output an animation effect (e.g., an effect of turning to a next page of a note shown in FIG. 5B, etc.) indicating the switching between the messages.

Meanwhile, in order to effectively manage a plurality of group messages, it is necessary to use a different attribute for each of the group messages. In the following description, a control method of setting an attribute of a group message shall be described in detail with reference to FIG. 2 (i.e., flowchart) and FIGS. 6A and 6B.

FIGS. 6A and 6B are diagrams for a control method of setting a cover (or a title) of a group message 302 according to one embodiment of the present invention. The following description shall be described with reference to FIG. 6 together with FIG. 2 as follows.

First of all, in a step S204, the controller 180 can receive a command for setting/changing an attribute for the prescribed group. FIG. 6 shows one example of a command for setting an attribute of a cover of a group message 302. Referring to FIG. 6A, if an attribute setting command 10f is applied to a group message 302 outputted through a chat window 300, the controller 180 can output an attribute setting menu 601. For example, as shown in FIG. 6A, the attribute setting command 10f may include a long touch input applied to the group message 302. And, the attribute setting menu 601 may include an item 'making a cover' or an item 'tagging'.

If the item 'making a cover' is selected, referring to FIG. 6B, the controller 180 outputs a virtual keypad and is then able to set up a cover of the group message 302 through a typing input received from a user. The controller 180 may then output the set cover 602 to the group message 302 outputted through the chat window 300.

Furthermore, according to one embodiment of the present invention, a control method of setting detailed attributes is proposed. For example, such detailed attributes may include the number of persons, a period (or date) and the like. A detailed setting method according to an embodiment is described with reference to FIG. 7 as follows.

FIGS. 7A, 7B and 7C are diagrams for a control method of setting an attribute (or a tag) of a group message 302 according to one embodiment of the present invention. The following description shall be described with reference to FIGS. 7A-7C together with FIG. 2 as follows.

First of all, in the step S204, the controller 180 can receive a command for setting/changing an attribute for the prescribed group. FIG. 7 shows one example of a command for setting up the number of persons and period for the group message 302. According to one embodiment of the present invention mentioned in the following description, assume that the payment messages include the messages associated with a specific theme. In case that if the number of persons participating in the travel or the period of the travel is set as tag information, it is able to provide a more convenient and smarter control method. Therefore, according to one embodiment of the present invention, it is proposed to set up the tag information at the group message 302 to be useful for the above-mentioned case.

Referring to FIG. 7A, an attribute setting menu 601 corresponding to a group message 302 is outputted. If an item 'tagging' is selected from the attribute setting menu 601, referring to FIG. 7B, the controller 180 can further output a tag input menu 701. In particular, the tag input menu 701 may further include items such as 'persons', 'period', 'weather' and the like. Hence, if a user touches each of the items included in the tag input menu 701, the user can input and set up a tag corresponding to the touched item.

FIG. 7C is a diagram for one example of the group message 302 having a cover 'Jeju Island Travel' in which '2 persons' and '3 nights and 4 days' are set for an item '# of persons' and an item 'period', respectively. Referring to FIG. 7C, the controller 180 can output the cover 602 and the tag information 702 to the group message 302 displayed on the chat window 300.

According to one embodiment of the present invention, it is intended to further propose a control method of automatically linking to a payment message appropriate for a prescribed situation during a period set as a tag. Such an embodiment shall be described in detail with reference to FIG. 8 as follows.

FIGS. 8A, 8B and 8C are diagrams for a control method of directly reading an associated message according to one embodiment of the present invention.

According to an embodiment related to FIG. 8, assume that a place information and a date and time information are included in payment information contained in a payment message.

Referring to FIG. 8A, the controller 180 currently outputs a prescribed group message 302 to a chat window 300. According to the example shown in the drawing, the prescribed group message 302 has a period tag '3 nights and 4 days' 702 set at a cover 'Jeju Island Travel' 602.

If a current location of the mobile terminal 100 matches a place information included in a prescribed payment message, the controller 180 can output a link button 801 for connecting to the prescribed payment message.

For instance, a prescribed payment message is a payment message for 'Yeomigi Botanical Garden ticket' and a location information on Yeomigi Botanical Garden can be included as a payment information in the corresponding payment message. If the mobile terminal 100 corresponds to the location information of Yeomigi Botanical Garden (i.e., if a location of the mobile terminal 100 is Yeomigi Botanical Garden), the controller 180 can output a link button 801, which is provided to directly connect to the corresponding payment message, to the group message 302.

If an input 10q of selecting the link button 801 is received, the controller 180 may be able to directly output a corresponding payment message 301-4. In particular, a user may directly read a linked payment message without sequentially reading other payment messages included in the group message 302.

Referring to FIG. 8C, the read payment message may be able to further output an indicator 802 indicating that it is linked to a current place/period and the like.

FIGS. 9A, 9B and 9C are diagrams for a control method of automatically totalizing amounts of uses during a tag set period according to one embodiment of the present invention.

Referring to FIG. 9A, the controller 180 currently outputs a prescribed message 302 to a chat window 300. According to the example shown in the drawing, a period tag '3 nights and 4 days' 702 is set at a cover 'Jeju Island Travel' 602.

Based on a payment amount information included in a payment message, the controller 180 totals payment amounts received during the set period by real time and is then able to output to provide a corresponding result to a user. In particular, the controller 180 totals the payment information included in the payment message received during the set period set as the period tag 702 and is then able to output the corresponding total as a real-time use amount 902 shown in FIG. 9B.

Moreover, according to one embodiment of the present invention, after a user has further set a target use amount tag 910, if the real-time use amount exceeds the set target use amount tag 901, it is able to further output a target amount exceeding indicator 903 to warn the exceeding.

If an evaluation information 903 on a travel/business trip is inputted by the user, the controller 180 may be able to further output the evaluation information 903 to a group message 302-2.

Meanwhile, according to one embodiment of the present invention, if a change occurs in a tag information such as persons, period or the like, it is intended to provide a control method of reflecting the corresponding change automatically. In particular, if a person tag information is changed into 3 persons from 2 persons, it is proposed to automatically change a payment history for payment informations related to the persons. Such an embodiment shall be described in detail with reference to the accompanying drawings as follows.

Figure 10A:
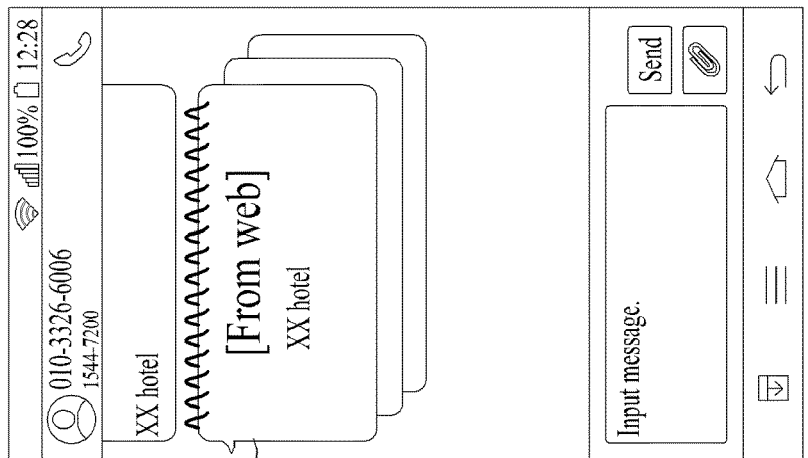
FIGS. 10A, 10B and 10C are diagrams for a control method in case of changing a tag of the number of persons in a group message 302 according to one embodiment of the present invention.
Figure 10B:
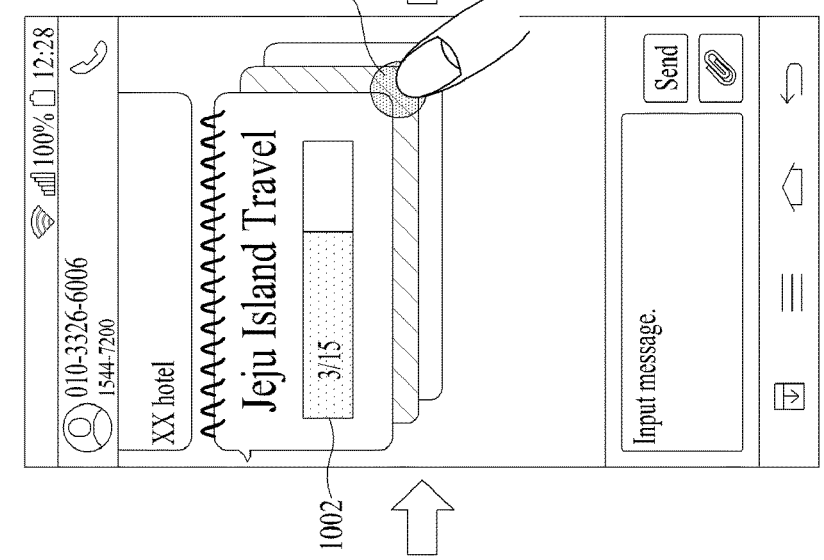
Figure 10C:
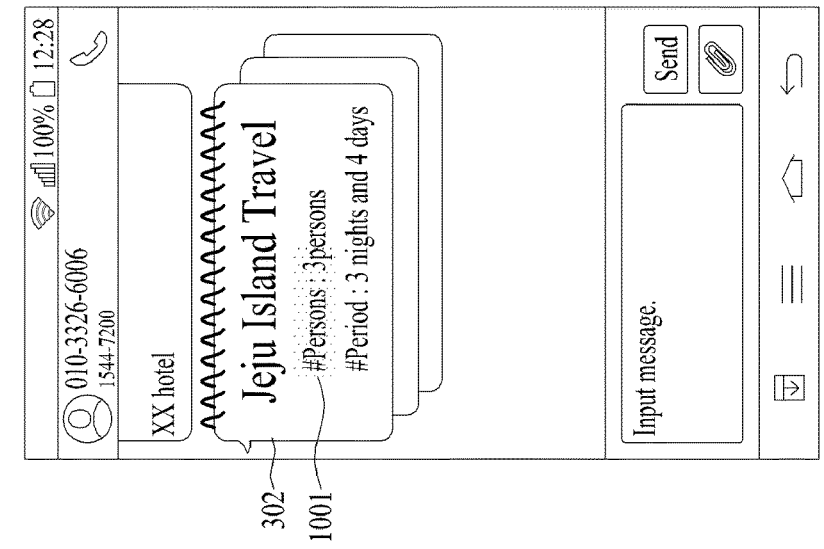

FIGS. 10A, 10B and 10C are diagrams for a control method in case of changing a tag of the number of persons in a group message 302 according to one embodiment of the present invention. The following description shall be described with reference to FIGS. 10A-10C together with FIG. 2 as follows.

First of all, in the step S204, the controller 180 can receive an attribute setting/changing command for the prescribed group. FIG. 10 shows one example of a person attribute change command of the group message 302. Subsequently, in a step S205, the controller 180 can select a message associated with the set/changed attribute from messages included in the group.

Referring to FIG. 10A, a group message 302 is currently outputted through a chat window 300. And, assume that a cover 'Jeju Island Travel' 602 is set for the group message 302. If a change that persons set at a person tag of the group message are changed from 2 persons to 3 persons is received, payment messages included in the group message 302 are searched for a payment message associated with the change of persons (i.e., a payment message associated with the change of persons is selected from payment messages included in the group message 302) and a result of the search can be provided to a user.

For instance, an amount to be paid for hotel rooms, tickets, airline tickets or the like may vary in accordance with the number of persons. On the other hand, an amount to be paid for a rent car may not be changed in accordance with a change of the number of persons (e.g., a case that the number of persons receivable in a single vehicle is changed from 2 persons to 3 persons for example). Based on a payment information included in a payment message, the controller 180 searches a payment message associated with a change of persons only and is then able to provide the found payment message. Table 1 in the following shows one example indicating whether a decreasing/increasing change is affected per payment message.

TABLE 1

|  | 2 persons → 1 person (Decrease) | 2 persons → 3 persons (Increase) |
|---|---|---|
| Hotel reservation payment message | Option Change 2 persons → 1 person | Option Change Extra bed |
| Rent reservation payment message | Change X | Change X |
| Airline ticket reservation payment message | Partial cancellation | New additional reservation |
| Breakfast restaurant reservation payment message | Option change 2 persons → 1 person | Option change 2 persons → 3 persons |

In Table 1, referring to one example of the hotel reservation payment message, if a tag is changed to 1 person from 2 persons, it may be efficient to change a room for 2 persons to a room for 1 person. In response to such a change, the controller 180 may connect a user to a website for the change (or output a URL of the website) or may send a change request message to a server of the hotel [S206], using a payment information of the hotel reservation payment message.

In response to the tag or attribute change, the controller 180 searches for payment items to be changed and may be then able to further output a progressive 1002 indicating the number of the payment items to be changed as a result of the search [FIG. 10B]. In particular, the progressive bar 1002 may include the number of payment messages included in a current group and the number of change required payment messages. According to the example shown in the drawing, the total number of the payment messages included in the group message 302 is 15 and the number of the change required payment messages is 3, which is denoted by '3/15'.

If a payment item change command 10h (e.g., an input of touching a progressive bar) is received, the controller 180 can directly output a payment message 1003 necessary to be changed.

Figure 11C:
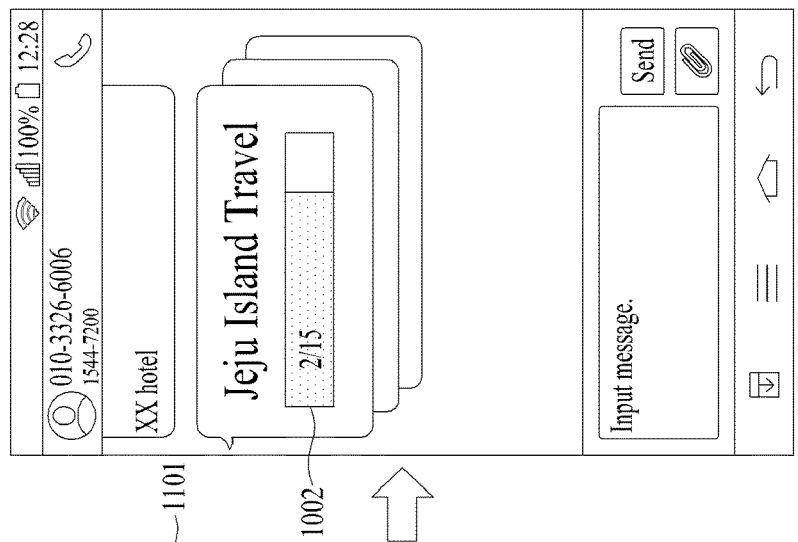
FIGS. 11A, 11B and 11C are diagrams for a control method of facilitating a change of a reservation through a change-required payment message according to one embodiment of the present invention.
Figure 11B:
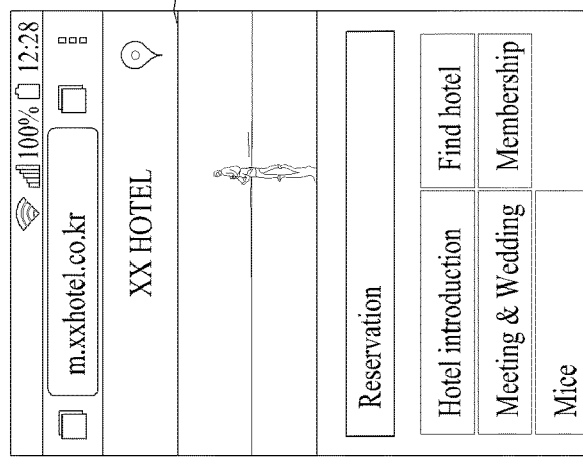
Figure 11A:
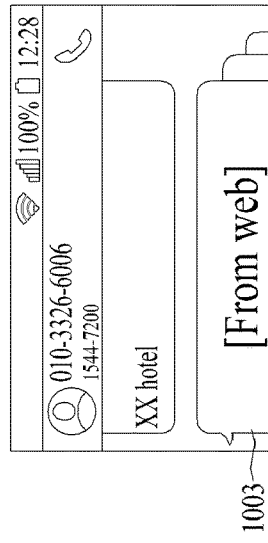

FIGS. 11A, 11B and 11C are diagrams for a control method of facilitating a change of a reservation through a change required payment message according to one embodiment of the present invention.

According to an embodiment associated with FIG. 11, it is proposed that a webpage information is included as a payment information included in a change required payment message and that a webpage is outputted based on such information.

Referring to FIG. 11A, a change required payment message 1003 is outputted to a chat window 300. If an input 10 of selecting the change required payment message is received, the controller 180 can output a webpage 1101 corresponding to the received input. Hence, a user can cancel/change a reservation easily through the outputted webpage 1101.

If the change or cancellation of the reservation is completed, the controller 180 may be able to reduce the number of the change required payment messages to 2 from 3.

Meanwhile, according to the embodiment mentioned in the above description, a case of changing persons (or, the number of persons) is described. In the following description, proposed is a control method of collectively cancelling payment message(s) included in a group message.

FIGS. 12A, 12B, 12C and 12D are diagrams for a control method of collectively cancelling payment message(s) included in a group message 302 according to one embodiment of the present invention.

Referring to FIG. 12A, the controller 180 currently outputs a group message 302 to a chat window 300. And, a $1^{st}$ payment message 301-1 is outputted through the group message 302. If a command 10k for cancelling a payment of the $1^{st}$ payment message 301-1 is received, referring to FIG. 12B, the controller 180 can output a popup window 1201 for checking whether to cancel a payment related to the $1^{st}$ payment message 301-1 together.

In this case, the related payment may mean payment messages belonging to the same group of the $1^{st}$ payment message 301-1.

One example of the payment cancelling command 10k may include an input of applying a drag in a left direction by maintaining a touch to a payment message [FIG. 12A].

If a confirmation command 10m is inputted through the popup window 1201, the controller 180 can sequentially output associated message(s). If the payment cancelling command 10k is applied to the sequentially outputted payment message, referring to FIG. 12D, the controller 180 can provide a control method for cancelling payments collectively.

The control method of processing payments collectively may include a control method of automatically sending a cancellation request message to a corresponding server. Alternatively, referring to FIG. 12D, cancellation webpages 1101-1 to 1101-3 corresponding to the payment information are outputted, whereby a user can easily make cancellation.

Meanwhile, according to the embodiment described with reference to FIG. 12, a command for cancelling a payment for each payment message is inputted. Yet, it may be able to collectively cancel the group message 302 entirely. Such an embodiment is described in detail with reference to FIG. 13 and FIG. 14 as follows.

FIGS. 13A, 13B, 13C, 14A and 14B are diagrams for a control method of collectively cancelling a group message 302 according to one embodiment of the present invention.

Figure 13A:
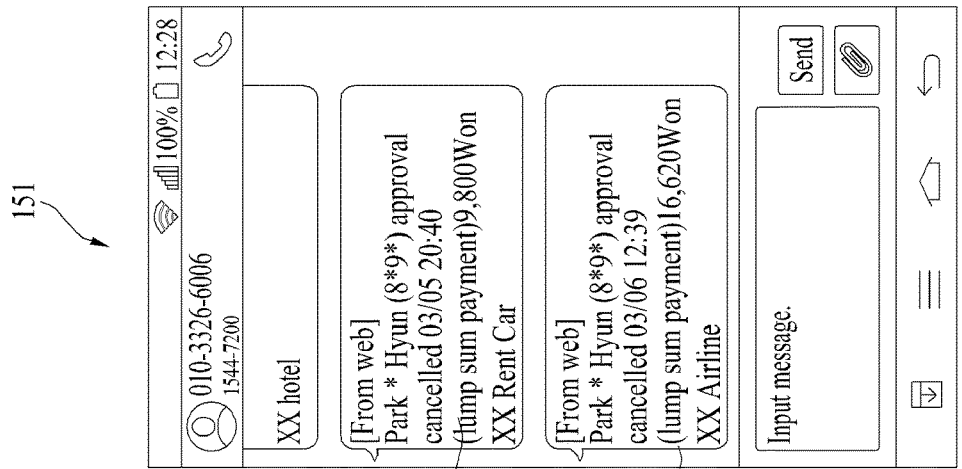
Figure 13B:
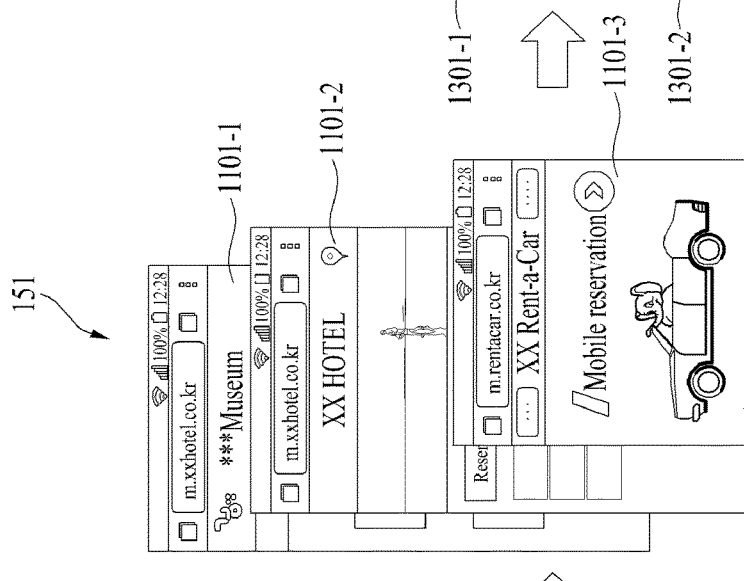

Referring to FIG. 13A, the controller 180 currently outputs a group message 302 to a chat window 300. If a command for collectively cancelling payments of the group message 302 is received, the controller 180 can provide a control method for collectively cancelling payments like the former example shown in FIG. 12D. For example of the control method, referring to FIG. 13B, it may be able to output a cancellation webpage corresponding to each payment message. Hence, a user may be able to easily cancel a payment through the outputted cancellation webpage. One example of the command for collectively cancelling the payments of the group message 302 may include a touch gesture of applying a drag 10n in a left direction by maintaining a touch to the group message 302.

Figure 13C:
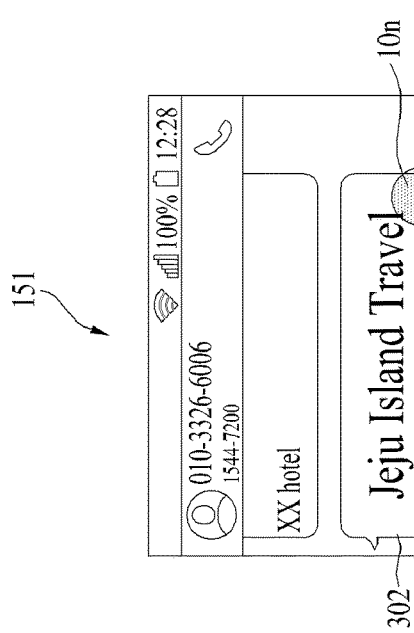
Figure 16A:
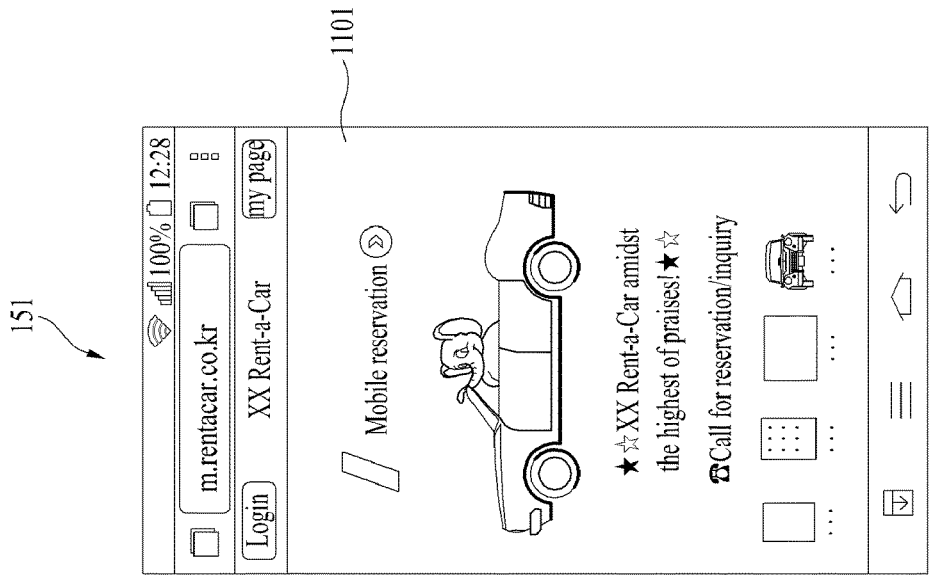
Figure 16B:
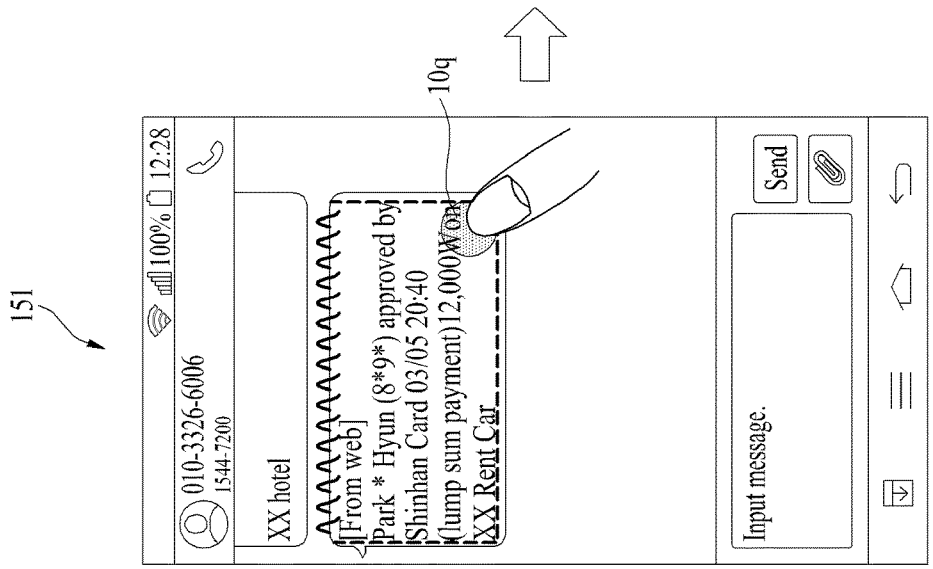

If the cancellation is complete, referring to FIG. 13C, a cancellation message 1301-1/1302-2 indicating each cancellation record can be received.

According to the control method shown in FIG. 13, the payments for the entire group message 302 are cancelled. Instead, payments may be cancelled per travel day. Referring to FIG. 14A, if a cancellation command of a payment for a prescribed day in a period set at the group message 302 is received, the controller 180 may provide a control method for payment cancellation for the corresponding day. As mentioned in the foregoing description, this control method may include a method of outputting webpages 1101-1 to 11-1-3 for cancellation.

Meanwhile, a control method after cancellation made by the above-mentioned method is described in addition as follows.

FIGS. 15A, 15B, 15C, 16A and 16B are diagrams for a control method of checking a cancelled payment message and making repayment according to one embodiment of the present invention.

Referring to FIG. 15A, a cancellation indicator 1501 can be outputted from a payment cancelled message according to one embodiment of the present invention. According to the example shown in the drawing, the cancellation indicator 1501 is displayed in a shape 1501 like a torn payment message.

If an input 10*nn* of selecting the cancellation indicator 1501 is received, the controller 180 can output details 301 of the cancelled payment message [FIG. 15B → FIG. 15C].

Meanwhile, a user may desire to change (repay) the cancelled payment message. Hence, if an input of applying a touch 10*q* to the cancelled payment message is received [FIG. 16A], the controller 180 can output a webpage 1101 for making a repayment [FIG. 16B].

According to the above description, if a payment is cancelled, the controller 180 may further receive a cancellation message containing a cancellation record. According to one embodiment of the present invention, it is proposed that this cancellation message is automatically included in an existing group message 302. This embodiment is described in detail with reference to FIGS. 17A-17C as follows.

FIGS. 17A, 17B and 17C are diagrams for a control method of automatically adding a cancelled payment message to an existing group message 302 according to one embodiment of the present invention.

Referring to FIG. 17A, a $1^{st}$ payment message 301-1 is outputted to a chat window 300. If the $1^{st}$ payment message 301-1 is cancelled based on the control methods described with reference to FIGS. 12 to 16, the controller 180 can receive a cancellation message 301-2 including the cancellation record. According to one embodiment of the present invention, it is proposed that the cancellation message 301-2 is automatically grouped into a group corresponding to an existing payment message or that the cancellation message 301-2 is automatically grouped with the payment message. In particular, referring to FIG. 17C, the controller 180 automatically groups the cancellation message 301-2 with the payment message 301-1 and is then able to group a single group message 302. In doing so, an indicator 1701 indicating that the cancellation message is automatically grouped may be outputted through the group message 302.

FIGS. 18A and 18B are diagrams for a control method of warning a case of making redundant payments according to one embodiment of the present invention.

Referring to FIGS. 18A and 18B, in case that a payment is cancelled based on the above-mentioned control method, a user may be able to make a new payment associated with the cancelled payment. For instance, a rent-a-car reservation at a $1^{st}$ rent-a-car company is cancelled and a rent-a-car reservation cam be then made at a $2^{nd}$ rent-a-car company. Moreover, irrespective of a presence or non-presence of the cancellation, at least two payments on a single item can be made [Redundant Payments]. According to one embodiment of the present invention, it is proposed to guide a user of the redundant payments.

Referring to FIG. 18A, the controller 180 is outputting a chat window 300 and is also outputting a $1^{st}$ payment message 301-1 and a $2^{nd}$ payment message 301-2. Based on payment informations of the received $1^{st}$ and $2^{nd}$ payment messages 301-1 and 301-2, the controller 180 may determine whether the $1^{st}$ and $2^{nd}$ payment messages 301-1 and 301-2 correspond to redundant payments. If determining that the $1^{st}$ and $2^{nd}$ payment messages 301-1 and 301-2 correspond to the redundant payments, the controller 180 outputs the $1^{st}$ and $2^{nd}$ payment messages 301-1 and 301-2 as a single group message 302 and is also able to control the outputted group message 302 to further output an indicator 1801 that warns the redundant payments.

Meanwhile, according to the above-described embodiments, a control method of receiving text messages and managing the received text messages by grouping them is explained. According to one embodiment of the present invention described in the following, a control method of making a payment easily based on travel itinerary information is described. In this case, the travel itinerary information may include a travel itinerary information saved by being previously composed by a user or a travel itinerary information received from another user. In particular, according to one embodiment of the present invention, it is proposed to compose a travel itinerary automatically based on the payment information included in the group message 302 and to send the composed travel itinerary to another user. Such an embodiment is described in detail with reference to the accompanying drawing as follows.

FIGS. 19A, 19B and 19C are diagrams for a control method of making payment easily based on a travel itinerary file saved in advance according to one embodiment of the present invention.

Referring to FIGS. 19A-19C, the travel itinerary file saved in advance may include a file composed in the mobile terminal 100 itself or a file composed and sent to the mobile terminal 100 by a document composer such as an external device (e.g., PC, etc.) or the like. And, the travel itinerary file may include payment information.

If an attribute setting command 10*f* is applied to a group message 601 outputted through a chat window 300 [FIG. 19A], the controller 180 can output an attribute setting menu 601. If an input 10*s* of selecting an item 'reference data link' from the attribute setting menu 601 is applied, the controller 180 can link to a previously saved file [FIG. 19B]. In this case, the file may include a travel itinerary file including information on a travel itinerary.

If a file including the travel itinerary information is linked, referring to FIG. 19C, the controller 180 can output the number 1904 of reservation required messages to a group message 302 outputted through the chat window 300.

According to the described embodiment, a user may be able to easily link to a payment based on a payment information included in a schedule information. A control method for making a payment shall be described in the following later.

Meanwhile, in case that a schedule of a travel or the like is changed, it is necessary to make repayments after cancelling all payments collectively or to change all payments collectively. Therefore, according to one embodiment of the present invention, in case that a travel itinerary is changed, a control method of changing it collectively is proposed.

FIGS. 20A, 20B and 20C are diagrams for a control method of changing payment associated with a travel collectively in case of changing a travel itinerary according to one embodiment of the present invention.

FIG. 20A and FIG. 20B show a control method of changing a date tag information of a group message 302. If a command 10*t* for changing a date tag 702 is received [FIG. 20A], the controller 180 can further output a calendar 2001 for a schedule change. If an input 10*u* of designating a specific date is applied to the outputted calendar 2001, the controller 180 may be able to change the date tag 702 to correspond to the designated date [FIG. 20C].

As mentioned in the foregoing description, if a date of a travel is changed, it is necessary to change an item on which a payment has been made already. Hence, according to one embodiment of the present invention, it is proposed to collectively change dates for payments based on payment informations included in a group message. Such a control method shall be described in detail later with reference to FIG. 23.

According to the above description, it is proposed to compose a travel itinerary automatically based on the payment information included in the group message 302 and to send the composed travel itinerary to another user. A control method of sending it to another user is described in detail with reference to FIGS. 21A-21C as follows.

FIGS. 21A, 21B and 21C are diagrams for a control method of sharing payment information included in a group message 302 with another user according to one embodiment of the present invention. The group message 302 contains payment informations associated with a specific business such as a travel, a business trip or the like. Hence, these payment informations can be utilized as schedule informations useful for another person to have a travel or a business trip. Therefore, according to one embodiment of the present invention, it is intended to provide a control method of sharing payment information included in a group message 302 with another person collectively.

FIG. 21A shows a configuration diagram of running a touchscreen 151' of a mobile terminal 100' of a sharing side of a user. If an input 10v of selecting a share button 2101 outputted through a message 302 displayed on the touchscreen 151' is applied, the controller 180 forwards a schedule information, which includes payment information included in a shared message 302', to a counterpart terminal.

FIG. 21B and FIG. 21C are configuration diagrams of a mobile terminal 100 of a shared side. Referring to FIG. 21B, a received message 301 is outputted to a chat window 300. And, an indicator 2102 indicating that the schedule information is attached is outputted through the received message 301.

If an input of selecting the indicator 2102 is received, the controller 180 may be able to create a group message 302 using the schedule information.

Having received the schedule information from the sharing side mobile terminal 100' in FIG. 21A, the mobile terminal 100 creates a group message 302 from the chat window 300 based on the received schedule information and is able to output a reservation required number 1904 like FIG. 19 (e.g., '40 reservations confirmed').

Figure 22A:
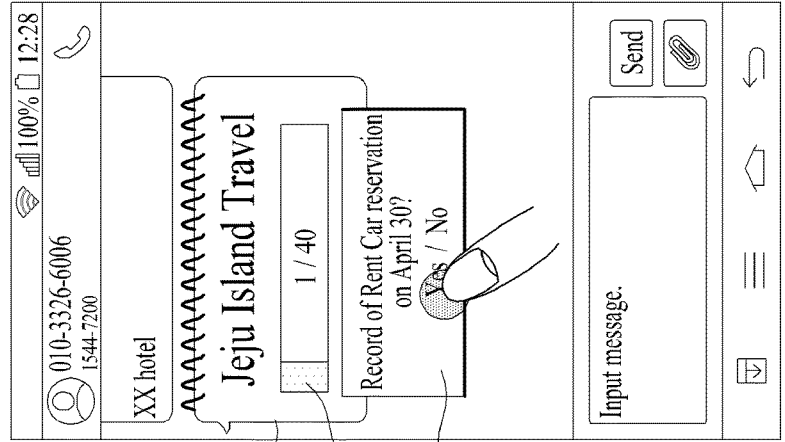
FIGS. 22A and 22B are diagrams for a control method of updating a reservation situation in response to a reception of a payment message 301 according to one embodiment of the present invention.
Figure 22B:
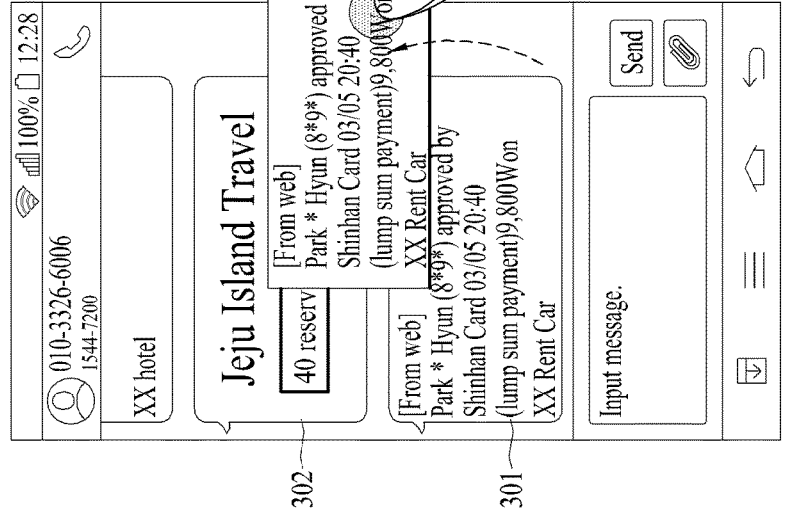

FIGS. 22A and 22B are diagrams for a control method of updating a reservation situation in response to a reception of a payment message 301 according to one embodiment of the present invention.

Referring to FIG. 22A, the group message 302 described with reference to FIG. 21 is currently outputted. Assume that the number of currently required reservations is 40.

If a prescribed payment message 301 is received, the controller 180 determines whether the received payment message 301 is a message for the required reservation. If the received payment message 301 is the message for the required reservation, the controller 180 can update a reservation status. For example of the reservation status, referring to FIG. 22B, it may be able to output a reservation status progressive bar 2201 indicating the number of the completed reservations over the total number of the required reservations.

Alternatively, the reservation status may be updated manually by a user without depending on the determination made by the controller 180. For instance, if a gesture of applying a drag 10w to a group message after touching the received payment message 301 is received, as shown in FIG. 21A, the controller 180 can determine that the received payment message 301 is the message associated with the reservation of the group message. In response to the touch gesture 10w, the controller 180 searches for a corresponding payment information and is then able to further output a popup window 2001 for checking whether a result of the search is correct. If a user's confirmation is received through the popup window 2001, the controller 180 determines that the reservation status of the corresponding payment information is complete and may be then able to update the reservation status based on the determination.

FIGS. 23A and 23B are diagrams for a control method of checking a reservation status easily based on the reservation status progressive bar 2201 on a group message 302 according to one embodiment of the present invention.

Referring to FIG. 23A and FIG. 23B, if a touch 10x is applied to a $1^{st}$ region on the reservation status progressive bar 2201, it is able to output a reservation complete list 2301-1. If a touch 10y is applied to a $2^{nd}$ region on the reservation status progressive bar 2201, it is able to output a reservation required list 2301-2.

FIGS. 24A, 24B and 24C are diagrams for a control method of grouping a received reservation information message 301-1 with a payment message according to one embodiment of the present invention.

Referring to FIG. 24, if a message including reservation information (i.e., a reservation information message) is grouped as well as a payment message, management of the reservation information message will be facilitated. For example of the reservation information message, as shown in FIG. 24A, if a reservation of a rental car is made, there is a message including reservation information on a vehicle number, a reservation start/end time, and a pickup place.

Referring to FIG. 24A, a received reservation information message 301-1 is outputted through a chat window 300. If an input of applying a drag to a group message 302 by maintaining a touch 10z to the received reservation information message 301-1 is received, the controller 180 can add the reservation information message 301-1 to the group message 302.

Particularly, since the reservation information message 301-1 is a message having high possibility in being checked later, it is able to re-output a link button 2401 for reading the corresponding message. If the link button 2401 is selected, the controller 180 may be able to output the reservation information message 301-1.

Meanwhile, it may be preferable that a payment message received in a set travel period is automatically included in a group message 302. An embodiment related to this is described in detail with reference to FIG. 25 as follows.

Figures 25A, 25B, 25C:
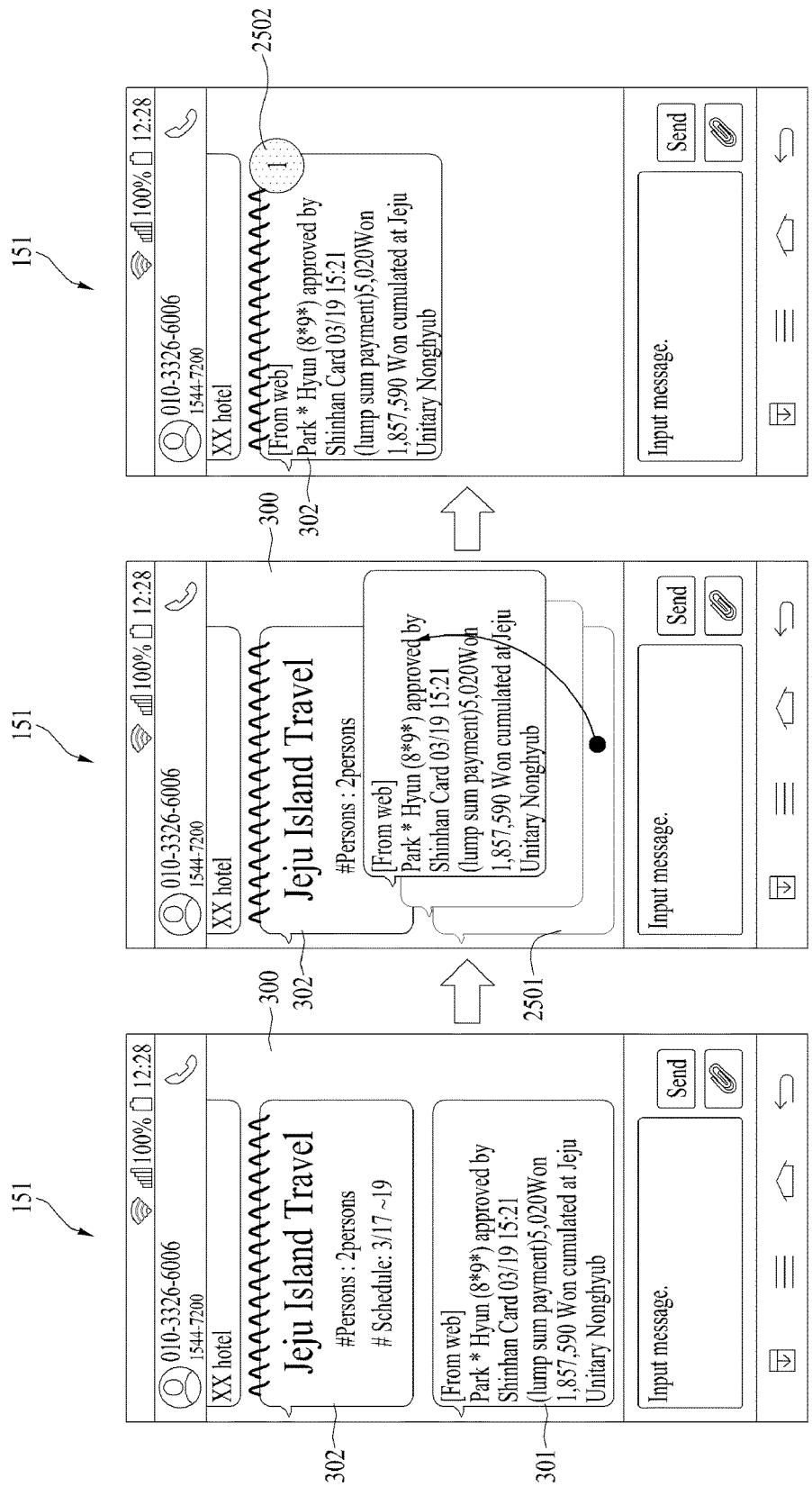
FIGS. 25A, 25B and 25C are diagrams for a control method of automatically grouping messages received in a set period according to one embodiment of the present invention.

FIGS. 25A, 25B and 25C are diagrams for a control method of automatically grouping messages received in a set period according to one embodiment of the present invention.

As mentioned in the foregoing description, according to one embodiment of the present invention, a period attribute (or a period tag) can be set in a group message 302. Hence, a payment message received in the set period may be automatically included in the group message 302.

Referring to FIG. 25A, a group message 302 and a payment message 301 are outputted to a chat window 300. In case that a period of the group message 302 is set to 3/17~3/19, referring to FIG. 25C, the controller 180 can control the payment message 301 received in the corresponding period to be automatically included in the group message 302. Thus, if the received payment message 301 is automatically included in the group message 302, a user may miss to check the corresponding message. Hence, according to one embodiment of the present invention, it is able to further output an indicator 2502 indicating the number of the messages automatically included in the group message 302. Moreover, when the received payment message 301 is automatically included in the group message 302, referring to FIG. 25B, it may be able to further output an animation effect 2501.

Meanwhile, according to one embodiment of the present invention, as mentioned in the foregoing description, a received payment message, a reservation check message or the like can be utilized as a schedule information. Therefore, according to one embodiment of the present invention, it is proposed to add a user's evaluation (e.g., an emoticon, a point, etc.) to the received message.

FIGS. 26A, 26B and 26C are diagrams for a control method of inputting user's evaluation to a received message according to one embodiment of the present invention.

Referring to FIG. 26A, the controller 180 currently outputs a message 301 to a chat window 300. If an input 10aa of selecting an emoticon button 3601 from the received message 301 is applied, referring to FIG. 26B, the controller 180 can output an emoticon list 2602. If an input 10bb of selecting an emoticon from the emoticon list 2602 is applied, the controller 180 can output the selected emoticon 2603 to the corresponding received message 301.

In the following description, a control method of deleting and editing a schedule information received from a counterpart terminal is described in detail with reference to FIGS. 27A and 27B.

FIGS. 27A and 27B are diagrams for a control method of deleting and editing a schedule information received from a counterpart terminal according to one embodiment of the present invention.

Referring to FIG. 27A, a message 301 received from a counterpart terminal and a schedule information indicator 2102 are outputted to a chat window 300. In this case, the schedule information indicator 2102 is the same as described with reference to FIG. 21.

According to one embodiment of the present invention, it is proposed to delete and edit a schedule information attached to the received message 301 based on an input of a prescribed touch gesture. In this case, the prescribed touch gesture may include a gesture 10cc of shaking by touching the schedule information indicator 2102.

In the following description, a control method of sorting messages in a group message 302 is described in detail with reference to FIGS. 28A-28C.

FIGS. 28A, 28B and 28C are diagrams for a control method of sorting and controlling messages in a group message 302 according to one embodiment of the present invention.

Referring to FIGS. 28A-28C, a group message 302 is currently outputted to a chat window 300. As mentioned in the foregoing description with reference to FIG. 19, the reservation required number 1904 calculated on the basis of a schedule information is outputted to the chat window 300 as well.

Meanwhile, a user may intend to select a desired reservation only from the reservation required number. The reason for this is that each person may have a different target of a travel amount. Therefore, according to one embodiment of the present invention, it is proposed that the group message 302 is sorted on a prescribed condition.

Referring to FIG. 28B, if an input 10dd of modifying the total use amount (or a total target amount) is received, the controller 180 can output messages 301-1 and 301-2 included in the group message 302 by sorting them in order of price [FIG. 28C]. Using the sorted messages, a user can control the rest of reservations to be made easily.

Meanwhile, if a payment information on a travel can be checked on a map, it will be convenient. According to one embodiment of the present invention, since a location information can be included in a payment information included in a received message, a control method of checking the payment information through a map using the location information is further proposed. Such an embodiment is described in detail with reference to FIG. 29 as follows.

FIGS. 29A, 29B and 29C are diagrams for a control method of checking a payment information through a map according to one embodiment of the present invention.

Referring to FIGS. 29A-29C, if an input of selecting a map button 2900 outputted to a group message 302 is received [FIG. 29A], the controller 180 can output a cover 2901 of the group message 302, a map 2902 and a payment information 2903 [FIG. 29B]. According to one embodiment of the present invention, the payment information may include a location information. Hence, the payment information 2903 can be outputted in form of a pin at a location included in the corresponding location information on the map. If the payment information 2903 is selected, it can be directly linked to a corresponding message.

FIG. 29C shows a map after completion of a travel. After the travel has been completed, a travel route 2904 is further outputted to provide a user with a route information as well as with the payment information.

Meanwhile, according to the above-described embodiment, a control method of managing messages as a group is described, by which the present invention is non-limited. A control method of enhancing convenience by managing objects except a message as a group is described in detail with reference to the accompanying drawings as follows.

FIGS. 30A, 30B, 30C, 31A, 31B, 32A and 32B are diagrams for a control method of managing items supposed to be purchased on an online store by groups according to one embodiment of the present invention.

Referring to FIG. 30A, a purchase page 3001 for a $1^{st}$ product and a purchase page 3002 for a $2^{nd}$ product are currently outputted. If a purchase button is selected through each of the purchase pages, referring to FIG. 30B, assume that the corresponding product is added to a shopping basket page 3003.

A list of purchase intended products 3004-1 to 3004-4 is outputted to the shopping basket page 3003. If an input of touching a prescribed purchase intended product 3004-1 and then dragging it to another purchase intended product 3004-2 is received, the controller 180 can output the two purchase intended products 3004-1 and 3004-2 as a single group product 3005.

Figure 31A:
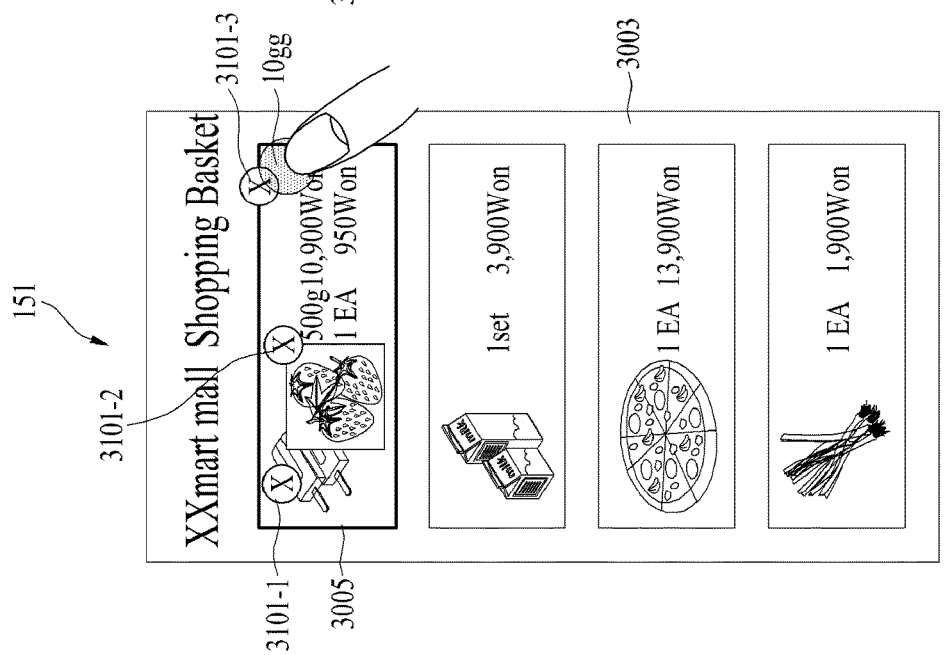
Figure 31B:
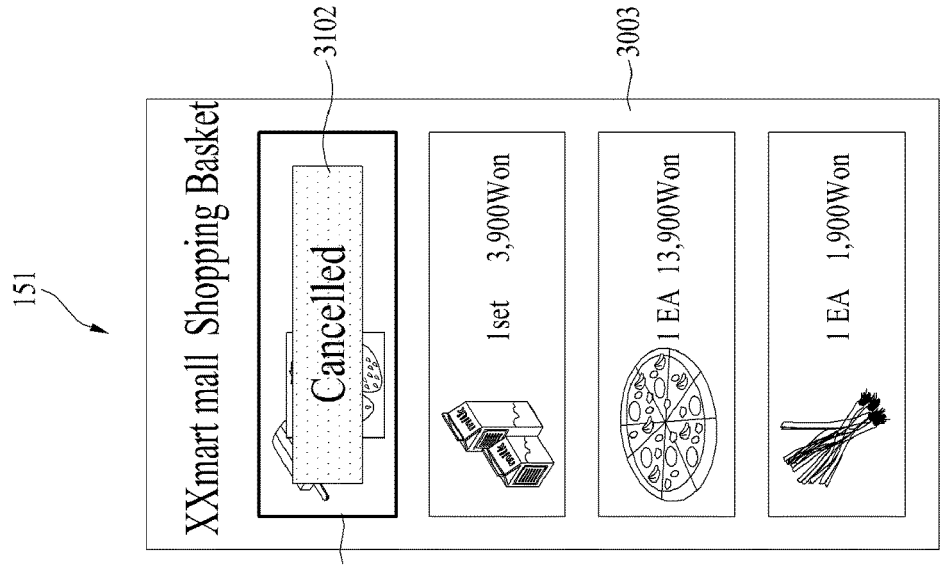

Referring to FIG. 31, a method of deleting and editing the group product 3005 is illustrated. The group product 3005 includes individual delete buttons 3101-1 and 3101-2 and a group delete button 3101-3. If the group delete button 3101-3 is selected, the controller 180 can the entire group product 3005 from the shopping basket page 3003 [FIG. 31B]. In this case, it may be able to display the deleted group product on the shopping basket page 3003 using a deletion indicator 3102.

If the individual delete button 3101-1 or 3101-2 is selected, the corresponding product can be excluded from the shopping basket page 3003. As an individual product is excluded from the group product 3005, if a single product remains only, the group product 3005 may be changed to an individual product again.

According to the embodiment described with reference to FIG. 31, a control method of collectively deleting products included in a group product 3005 is explained. Meanwhile, according to another embodiment of the present invention, a control method of changing a quantity of products included in the group product 3005 effectively is proposed. Such an embodiment is described in detail with reference to FIG. 32 as follows.

Figure 32A:
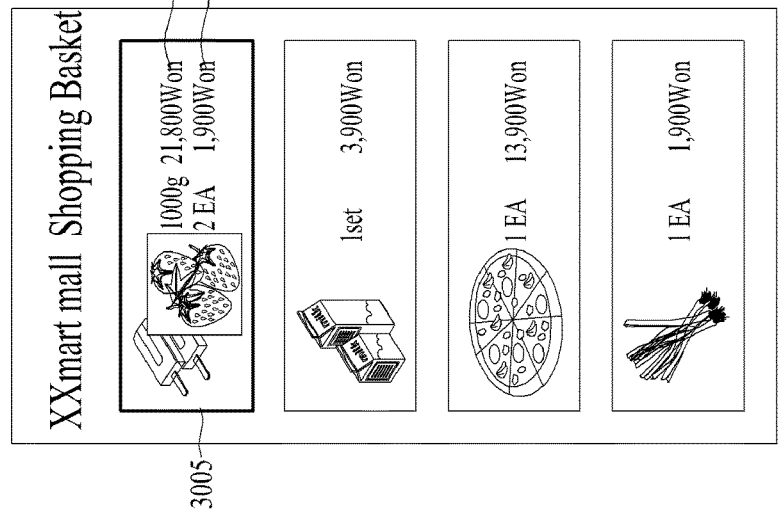
Figure 32B:
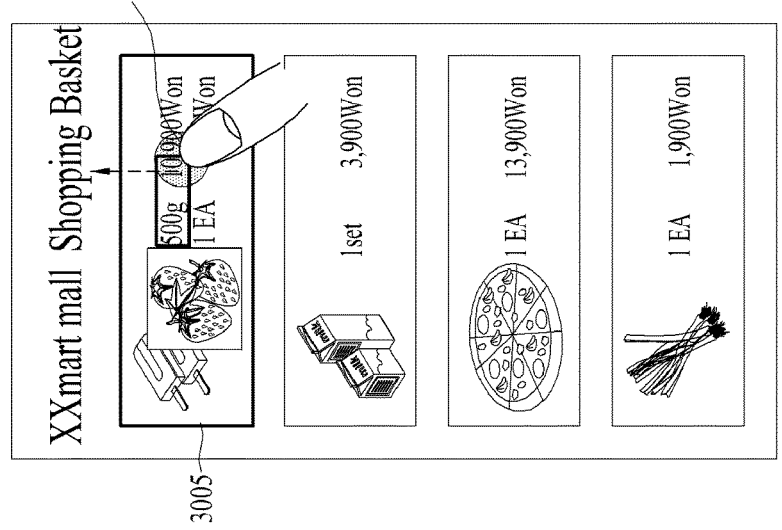

FIGS. 32A and 32B is a diagram for a control method of changing a quantity of products included in a group product 3005 effectively according to one embodiment of the present invention.

Referring to FIG. 32, as a quantity of a $1^{st}$ product included in a group product 3005 is changed, the controller 180 according to one embodiment of the present invention can change a quantity of a $2^{nd}$ product included in the group product 3005 to correspond to the changed quantity of the $1^{st}$ product. For instance, referring to FIG. 32A, if a quantity of the $1^{st}$ product included in the group product 3005 is changed to 1,000 g from 500 g twice [3201-1], a quantity of the $2^{nd}$ product included in the group product 3005 can be changed from 1 to 2 twice [3201-2]. In particular, a quantity of the group product 3005 can be changed collectively.

According to the embodiment described with reference to FIG. 32, it is proposed to change all quantities in the group product 3005 at a predetermined rate. In the following description with reference to FIGS. 33A-34, it is proposed to change a quantity in a group product 3005 effectively using a prescribed recipe information.

FIGS. 33A and 33B are diagrams for a control method of effectively purchasing material required for a prescribed food in accordance with the number of persons based on recipe information according to one embodiment of the present invention.

For the example shown in FIG. 33, assume that a recipe shown in Table 2 is saved.

TABLE 2

| Cooking material | Quantity/person |
|---|---|
| Blue crab | 500 g |
| Zucchini | 100 g |
| Radish | 150 g |
| Onion | 80 g |
| Scallion | 20 g |

According to one embodiment of the present invention, based on the recipe information, it is proposed to add products and quantities appropriate for cooking material to a shopping basket automatically.

FIG. 33A shows a shopping basket list 3005 appropriate for 1 person, while FIG. 33B shows a shopping basket list 3005 appropriate for 3 persons. According to one embodiment of the present invention, it is proposed to purchase accurate quantities fit for the number of persons based on recipe information instead of tripling all products in case of changing the number of person(s) to 3 from 1.

According to the recipe information shown in Table 2, zucchini prepared by an on-line store may be purchased by 150 g units despite that 100 g of amber is necessary. Hence, the number of zucchinis will be 2 in case of purchasing 300 g for 3 persons as well as purchasing 200 g for 2 persons. Hence, according to this example, a zucchini is necessary for 1 person. Even if the number of persons is changed to 3 from 1, a quantity of zucchinis will be changed to 2 appropriate for the material for 3 persons.

On the other hand, in case of the blue crab product that can be purchased by g units, a quantity of the blue crab can be changed from 500 g for 1 person to 1,500 g for 3 persons.

Meanwhile, a user may not want to purchase prescribed products among the products included in the shopping basket using the recipe information. For instance, the prescribed products may include a product purchased by a user in advance, a product failing to fit user's taste, and the like. Hence, as mentioned in the foregoing description, the user may be able to delete the prescribed product(s) 3302 from the shopping basket list using the recipe information.

FIG. 34 is a diagram for a control method of automatically deleting sources redundantly included in a plurality of dishes using recipe information according to one embodiment of the present invention.

Referring to FIG. 34, regarding a shopping basket list, a $1^{st}$ group product 3005-1 for blue crab soup for 5 persons and a $2^{nd}$ group product 3005-2 for soybean paste stew for 2 persons are outputted to a shopping basket page 3003. According to the two recipe informations, a $1^{st}$ recipe information on the blue crab soup assumes that 200 g of zucchini is required for 5 persons. And, a $2^{nd}$ recipe information on the soybean paste stew assumes that 100 g of zucchini is required for 2 persons. When zucchini is sold by 150 g units, it is necessary to purchase 300 g of zucchini amounting to 2 zucchinis to meet the 200 g required for the $1^{st}$ group product 3005-1. And, it is necessary to purchase 100 g of zucchini amounting to 1 zucchini to meet the 100 g required for the $2^{nd}$ group product 3005-2. Hence, in case that separate zucchinis are purchased in the $1^{st}$ group product 3005-1 and the $2^{nd}$ group product 3005-1, respectively, total 3 zucchinis are required. Yet, since 200 g of 300 g of 2 zucchinis are necessary in the $1^{st}$ group product 3005-1, the remaining 100 g can be used as a cooking material of the soybean paste stew. And, the controller 180 may control the zucchini to be automatically deleted from the $2^{nd}$ group product 3005-2.

Therefore, according to one embodiment of the present invention, the controller 180 controls redundant material in a plurality of group products to be automatically deleted using the recipe information, thereby preventing the waste of cooking material.

So far, the collective managements of text messages and product items are described. According to the description in the following, a control method of collectively managing various ID cards, credit cards and the like included in a user's wallet is described.

First of all, in case of wallet loss or theft, theft report/loss report/reissuance request for ID cards, credit cards and the like kept in the wallet should be made one by one. If the number of the ID and/or credit cards in use increases, the report/request procedures cause considerable inconvenience. Therefore, according to one embodiment of the present invention, a control method of collectively making theft report/loss report/reissuance request in case of wallet theft or loss is proposed.

Figure 35A:
Figure 35B:

FIGS. 35A, 35B and 25C are diagrams for a control method of collectively managing messages received from financial institutions/companies (e.g., a credit card company, a bank company, etc.) according to one embodiment of the present invention.

In general, in case of user's financial transactions, information related to a corresponding transaction is received as a message from a corresponding financial company. According to one embodiment of the present invention, when an outgoing phone number of a message is saved in the memory 170, it is proposed to collectively manage messages from financial companies/institutions by setting group attributes. In particular, the group attribute setting may mean that a corresponding outgoing phone number is included in a wallet group.

FIG. 35A is a diagram for one example of configuration of saving an outgoing phone number of a prescribed financial company (e.g., Shinhan Card Company) as a contact. When a corresponding phone number is saved as a contact, if a group attribute is set to 'financial/wallet' 3501, the corresponding outgoing phone number can be included in a financial/wallet group. According to one embodiment of the present invention, it is able to control messages included in the financial/wallet group to be collectively managed.

Figure 35C:

FIG. 35B shows a received text message list 3504. According to one embodiment of the present invention, a text message received from an outgoing number included in the financial/wallet group can be displayed in a manner of being identifiable from the text message list 3504. For instance, referring to FIG. 35C, a financial/wallet indicator 3503 indicating that it is included in the financial/wallet group can be outputted to a corresponding text message item together with profile photo 3502 of a corresponding contact.

In the following description, a control method of effectively managing a message from an outgoing phone number included in a wallet group is described in detail with reference to FIG. 36 as follows.

FIGS. 36A, 36B and 36C are diagrams for a control method of collectively managing messages corresponding to a wallet group according to one embodiment of the present invention.

Referring to FIG. 36A, the text message list 3504 described with reference to FIG. 35 is currently outputted. If a touch 10*jj* to the financial/wallet indicator 3503 is applied, the controller 180 can output a card list 3601 including at least one or more card items 3602-1 to 3602-3.

The card items included in the card list 3601 may include items corresponding to outgoing phone numbers included in the financial/wallet group shown in FIG. 35, respectively. For instance, the 2$^{nd}$ card item 3602-2 may include an item corresponding to the outgoing phone number of 'Shinhan Card Company' shown in FIG. 35.

In particular, according to the described embodiment, a message belonging to a financial/wallet group can be read in a manner of being distinguished from other messages.

According to one embodiment of the present invention, based on a prescribed touch gesture 10*kk* applied to each card item outputted to the card list 3601, it is able to sequentially output messages received from a corresponding outgoing phone number [FIG. 36C]. In this case, the received message may include a payment information on a payment made using a corresponding card. Hence, a user can easily check a record of the payment made with the corresponding card through each card item. Each of the card item shown in FIG. 36B is used like a cover of an individual card. If a cover is turned by a touch gesture 10*kk* like a user's gesture of turning a page, payment informations can be read sequentially.

According to one embodiment of the present invention, referring to FIG. 36C, a cumulative use amount 3603 (cumulative payment amount) corresponding to each card item may be outputted together with each card item (e.g., a cover of each card item).

Meanwhile, although the above-mentioned embodiment relates to a control method for managing text messages related to financial matter, a control method of further managing an ID card according to one embodiment of the present invention is proposed. When a user lost a wallet, it is able to effectively apply a control of loss/reissuance of an ID card and the like.

If a user's registration command is received, the controller 180 may output a 3$^{rd}$ card item 3602-3 for a corresponding ID card to the card list 3601.

In the following description, a method of controlling a loss report to be accepted by an outgoing phone number registered at a financial/wallet group is described in detail with reference to FIGS. 37A, 37B, 38A, 38B and 38C as follows.

Figure 37A:
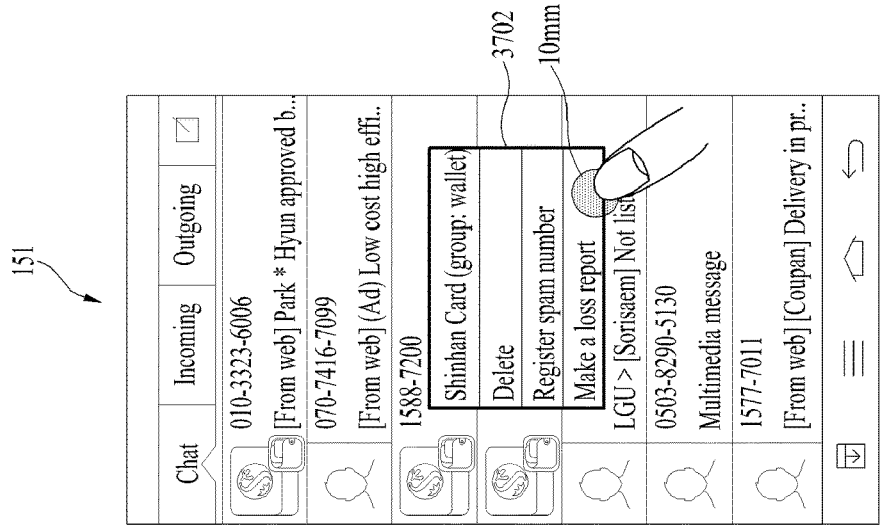
Figure 37B:
Figure 37C:

First of all, FIGS. 37A-37C are diagrams for a control method of preforming a loss report individually through a text message list 3504 according to one embodiment of the present invention.

Referring to FIG. 37A, the text message list 3504 of the above-described embodiment is currently outputted. And, a financial/wallet indicator 3503 is outputted to the text message list corresponding to a financial/wallet group.

If a menu paging command is applied to a prescribed text message item, referring to FIG. 37B, the controller 180 can output a menu window 3701 applicable to the prescribed text message item. According to one embodiment of the present invention, it is proposed that an item 'Loss report' is further included in the menu window for a text message included in a financial/wallet group.

For instance, if a prescribed touch input 10*mm* (e.g., a long touch input to the item) is applied to a message 3700 included in a financial/wallet group [FIG. 37A], the controller 180 can output a menu window 3702 further including an item 'loss report' [FIG. 37C]. If the item 'loss report' is selected, the controller 180 can control a text message, data or a call signal to be sent to a preset phone number in order to have a loss report to be automatically accepted.

Moreover, according to one embodiment of the present invention, a lost report button 3703 can be outputted in order make a collective loss report by recognizing that a wallet was lost based on a received text message. For instance, at least two loss reports are made by the aforementioned method, at least two text messages related to loss are received, a text message indicating that a payment over a preset amount is made, or the like.

In the following description, after one loss report has been made, a control method of making another loss report conveniently and efficiently is proposed.

FIGS. 38A, 38B and 38C are diagrams for a control method of making loss reports for a plurality of cards effectively according to one embodiment of the present invention.

Referring to FIG. 38A, the text message list 3504 of the aforementioned embodiment is currently outputted. A loss acceptance confirmation message item 3801 for a loss report made by a user is outputted to the text message list 3504.

If a loss acceptance confirmation message item 3801 is selected from the text message list 3504, referring to FIG. 38B, the controller 180 can output details 3802 of the loss acceptance confirmation message.

According to one embodiment of the present invention, it is able to further output an additional loss report button 3803 for adding a loss report of another card together with the details 3802 of the loss acceptance confirmation message.

If an input of selecting the additional loss report button 3803 is received, the controller 180 can output a popup window 3804 including at least one card item. The card item outputted to the popup window 3804 may correspond to card items included in the financial/wallet group.

If the card item(s) is selected through the popup window 3804, referring to FIG. 38C, the controller 180 may be able to output a progressive bar 3805 indicating a loss acceptance progress level (status) for the selected card item(s). In this case, the progressive bar 3805 may be able to indicate a progress level (status) using the number of the currently lost report complete items among the total number of the loss report required card items.

Referring to FIG. 38C, the loss acceptance required card item may be outputted in a manner of being combined into a single group display object 3806. If a touch gesture of turning the group display object 3806 is received, it may be able to output details (e.g., a detailed progressive level for each card item, a transceived message, etc.) of each loss report required card item.

In the following description, another embodiment of making a loss report is described in detail with reference to FIG. 39.

FIGS. 39A, 39B and 39C are diagrams for a control method of making a loss report on an outputted card list 3601 according to one embodiment of the present invention.

Referring to FIG. 39A, like the former embodiment described with reference to FIG. 36, the card list 3601 is currently outputted. If a prescribed touch gesture (e.g., a gesture of long touching a $1^{st}$ card item 3602-1) is applied to the $1^{st}$ card item 3602-1, the controller 180 can further output a loss report button 3901. If the loss report button 3901 is selected, the controller 180 may control a loss report corresponding to the card item to proceed. For instance, the controller 180 may further output a popup window 3902 querying whether to submit a loss report.

In the following description, a control method of collectively managing a message related to a loss report is described in detail with reference to FIGS. 40A-40C.

FIGS. 40A, 40B and 40C are diagrams for a control method of managing a message related to a loss report collectively according to one embodiment of the present invention.

Referring to FIG. 40A, a text message list 3504 is currently outputted. And, a group message item 4001 associated with a loss report is inclusively outputted to the text message list 3504. And, transceived messages for a card item, for which a loss report is in progress or being completed, may be included in the group message item 4001.

If an input of selecting the group message item 4001 is received, the controller 180 may output details 4002-1 and 4002-2 of the transceived messages included in the group message item 4001. Each of the transceived messages may be grouped per outgoing phone number (or per card company). For instance, the $1^{st}$ details 4002-1 may include a group of messages transceived for Lotte Card and the $2^{nd}$ details 4002-2 may include a group of messages transceived for Samsung Card.

The controller 180 according to one embodiment of the present invention can obtain a card loss report progress status or a card reissuance request progress status by analyzing transceived messages. For instance, if a text 'Loss report is accepted.' Is received as a received message, the controller 180 may obtain a progressive status of a current loss report by analyzing such a keyword as 'loss', 'accept' and the like.

Referring to FIG. 40B, the controller 180 may output progressive bars 4003-1 and 4003-2 for the progressive level to details of the outputted transceived messages 4002-1 and 4002-2, respectively.

According to another embodiment of the present invention, while a loss report is in progress, it is intended to further propose a control method of withdrawing the loss report. Since a user thought that a wallet was lost, while a lost report is in progress, if the lost wallet is found, it is unnecessary to continue the loss report. Therefore, according to one embodiment of the present invention, referring to FIG. 40C, a withdraw button 4004 is outputted together with the details 4002-3 of the transceived message. If the withdraw button 4004 is selected, a withdrawal procedure for the loss report in progress may proceed.

Figure 41:
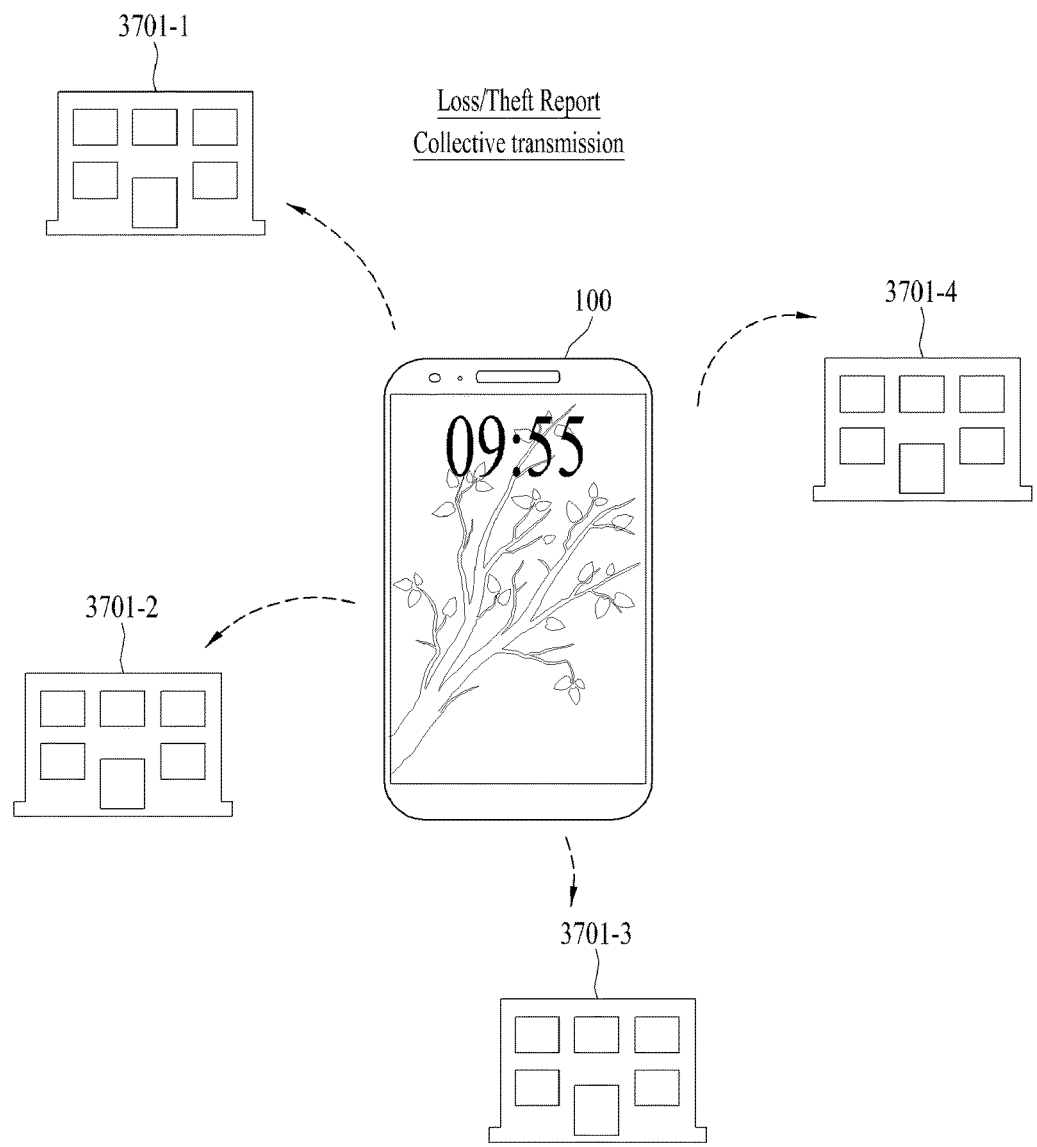
FIG. 41 is a diagram for the concept of a control method for performing a report procedure collectively according to one embodiment of the present invention.

FIG. 41 is a diagram for the concept of a control method for performing a report procedure collectively according to one embodiment of the present invention.

According to the above-described embodiment, embodiments of the present invention propose that a loss report procedure, a theft report procedure, and a loss report withdrawal procedure are collectively performed. These report procedures may be performed based on a method of transceiving preset informations by methods agreed with financial institutions or companies in advance.

Referring to FIG. 41, in response to an input of selecting the loss/theft report button 3601, the mobile terminal 100 can control the loss/theft reports to be collectively sent to a plurality of loss report contacts 3701-1 to 3701-4 included in the management list 3003.

And, by connecting to the outgoing phone number, it may be able to output a screen for a user to directly make a loss report.

Accordingly, embodiments of the present invention provide various effects and/or features.

According to at least one of embodiments of the present invention, it is advantageous in that a plurality of items can be easily managed through a mobile terminal.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a wireless communication unit configured to transmit and receive information;
a user input unit;
a touchscreen; and
a controller configured to:
receive messages via the wireless communication unit, wherein the received messages include card payment receipt messages;
cause the touchscreen to display the received messages;
group a plurality of the received messages as a prescribed group;
cause the touchscreen to display the prescribed group;
receive a touch input to a selected card payment receipt message of the prescribed group;
cause the touchscreen to display a window for checking whether to cancel a payment related to the selected card payment receipt message; and
cause the wireless communication unit to transmit a cancellation request signal to a corresponding server when a confirmation command is received via the window,
wherein the payment related to the selected card payment receipt message is associated with the card payment receipt messages of the prescribed group.

2. The mobile terminal of claim 1, wherein the controller is further configured to:
receive a day period input specifying a number of days; and
include a card payment receipt message into the prescribed group which was received during the specified number of days.

3. The mobile terminal of claim 1, wherein the controller is further configured to:
receive a command for changing a people count setting for each of one or more messages of the prescribed group from a first number of people to a second number of people; and
cause the wireless communication unit to transmit a change request signal to change the people count setting for each of the one or more messages to the second number of people.

4. The mobile terminal of claim 1, wherein one or more messages of the prescribed group includes card payment information.

5. The mobile terminal of claim 4, wherein the controller is further configured to cause the touchscreen to display a total payment amount of the card payment information corresponding to the one or more messages of the prescribed group.

6. The mobile terminal of claim 5, wherein the controller is further configured to cause a notification to be output when the total payment amount exceeds a threshold amount.

7. The mobile terminal of claim 1, wherein the controller is further configured to:
cause the touchscreen to display a guide line indicating a correspondence between a newly received message and the prescribed group; and
include the newly received message into the prescribed group in response to a selection command of the guide line.

8. The mobile terminal of claim 1, wherein the controller is further configured to cause the touchscreen to display a chat window comprising messages wherein the messages of the prescribed group are combined.

9. The mobile terminal of claim 1, wherein the controller is further configured to cause the touchscreen to display an indicator indicating that a new message is automatically included into the prescribed group.

10. A method of controlling a mobile terminal, comprising:
receiving messages, wherein the received messages includes card payment receipt messages;
displaying the received messages via a touchscreen of the mobile terminal;
grouping a plurality of the received messages as a prescribed group;
displaying the prescribed group;
receiving a touch input to the selected card payment receipt message of the prescribed group;
displaying a window for checking whether to cancel a payment related to the selected card payment receipt message; and
transmitting a cancellation request signal to a corresponding server when a confirmation command is received via the window,
wherein the payment related to the selected card payment receipt message is associated with the card payment receipt messages of the prescribed group.

11. The method of claim 10, further comprising:
receiving a day period input specifying a number of days; and
including a card payment receipt message into the prescribed group which was received during the specified number of days.

12. The method of claim 10, further comprising:
receiving a command for changing a people count setting for each of one or more messages of the prescribed group from a first number of people to a second number of people; and
transmitting a change request signal to change the people count setting for each of the one or more messages to the second number of people.

13. The method of claim 10, wherein one or more messages of the prescribed group includes card payment information.

14. The method of claim 13, further comprising displaying a total payment amount of the card payment information corresponding to the one or more messages of the prescribed group.

15. The method of claim 14, further comprising outputting a notification when the total payment amount exceeds a threshold amount.

16. The method of claim 10, further comprising:
displaying a guide line indicating a correspondence between a newly received message and the prescribed group; and
including the newly received message into the prescribed group in response to a selection command of the guide line.

17. The method of claim 10, further comprising displaying a chat window comprising messages wherein the messages of the prescribed group are combined.

18. The method of claim 10, further comprising displaying an indicator indicating that a new message is automatically included into the prescribed group.

* * * * *